United States Patent [19]

Grumet

[11] Patent Number: 4,601,053

[45] Date of Patent: Jul. 15, 1986

[54] AUTOMATIC TV RANGING SYSTEM

[75] Inventor: Alex Grumet, Whitestone, N.Y.

[73] Assignee: Grumman Aerospace Corporation, Bethpage, N.Y.

[21] Appl. No.: 553,623

[22] Filed: Nov. 21, 1983

[51] Int. Cl.[4] .............................................. G06K 9/00
[52] U.S. Cl. ....................................... 382/1; 250/558; 356/12; 358/88; 358/107; 364/561
[58] Field of Search ...................... 356/3, 12; 250/558; 382/1; 358/88, 107, 10, 139; 377/17; 364/561

[56] References Cited

U.S. PATENT DOCUMENTS

| | | | |
|---|---|---|---|
| 2,786,096 | 3/1957 | Palmer | 358/107 |
| 3,678,190 | 7/1972 | Cook | 358/88 |
| 3,706,493 | 12/1972 | Redmann | 358/107 X |
| 3,961,851 | 6/1976 | Gerharz | 356/12 X |
| 4,158,131 | 6/1979 | Probst | 364/571 |
| 4,335,962 | 6/1982 | Di Matteo et al. | 250/558 |
| 4,480,264 | 10/1984 | Duschl | 358/10 |

Primary Examiner—Leo H. Boudreau
Assistant Examiner—Jose L. Couso
Attorney, Agent, or Firm—Richard G. Geib

[57] ABSTRACT

A range-finding system comprising the hardwired video processing of two side-by-side TV stereo images of a scene to provide automatic, rapid, quantitative ranging to noncooperative objects. A single TV camera with appropriate optics to provide stereo inputs or, in a preferred embodiment, two TV cameras, provide the stereo images. Range is determined for any change of contrast in the common TV stereo scene to obtain the parallax displacement of corresponding object features with a three scan line delay of less than 200 microseconds. The video of the synchronized line scan of both cameras is stored as they are scanned, thus range can be determined with relative motion between the stereo camera and objects in the scene. Range is stored in on-board RAM's for each pixel of the TV scene and is available after three TV lines of delay. Range up-dating is continuous as the TV raster is scanned, or the range of a particular TV frame may be frozen for detailed study. Any part of the electromagnetic spectrum that can provide TV imagery can be used in the ranging system.

37 Claims, 20 Drawing Figures

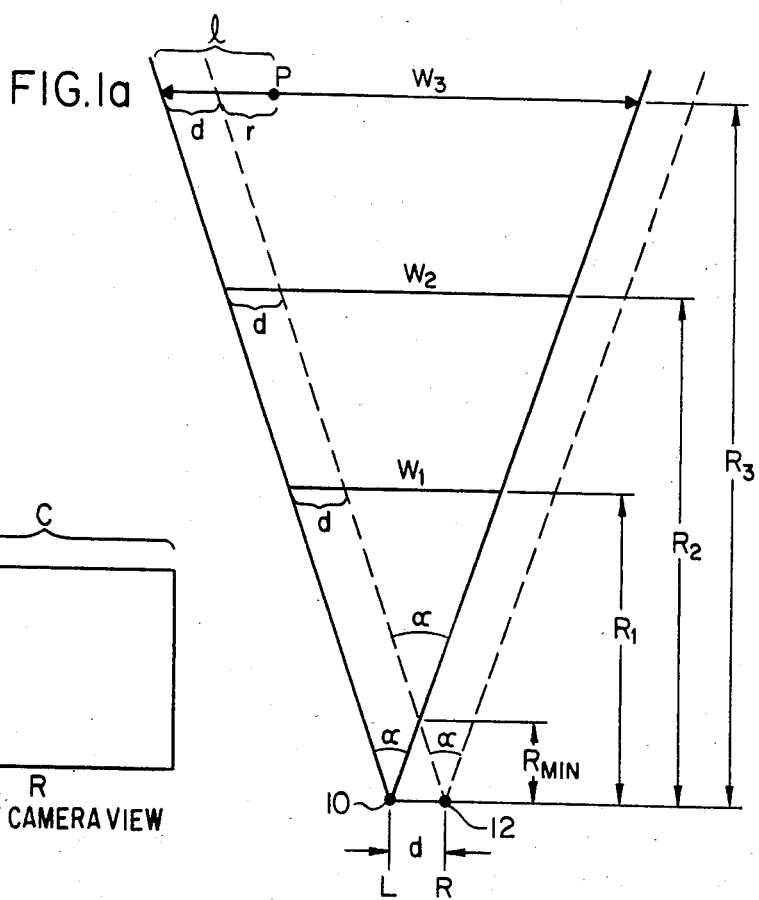
FIG.1a
FIG.1b
LEFT CAMERA VIEW  RIGHT CAMERA VIEW
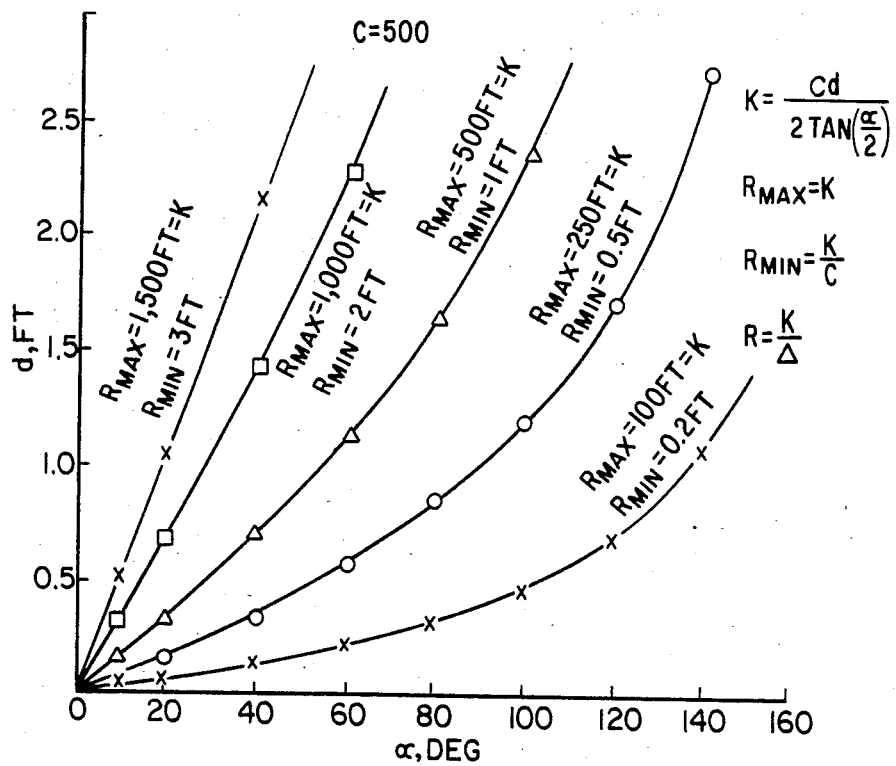
FIG.2
$$K = \frac{Cd}{2\,TAN\left(\frac{\alpha}{2}\right)}$$
$$R_{MAX} = K$$
$$R_{MIN} = \frac{K}{C}$$
$$R = \frac{K}{\Delta}$$

NOTE: THE 4 MIRROR ARRANGEMENT IN FRONT OF THE CAMERA PROVIDES A SPLIT SCREEN STEREO IMAGE PAIR TO THE CAMERA

• DATA LINES ONLY, ADDRESS LINES OMITTED FOR CLARITY
• SEE FIG.11 FOR ADDR MUX $\triangle_A = \ell_A - r_A$ $\triangle_B = \ell_B - r_B$ $R_B = \dfrac{K}{\triangle_B}$ $R_A = \dfrac{K}{\triangle_A}$

AUTOMATIC TV RANGING SYSTEM

BACKGROUND OF THE INVENTION

1. Field of the Invention

This invention relates to automatic ranging systems and, more particularly, to an automatic ranging system in which range to an object is obtained by measuring parallax displacement in two TV stereo views of the object.

2. Background of the Invention

A number of ranging or distance measuring techniques presently exist that use RADAR or pulse-echo time of flight of a reflected RF signal. There are also other well-known cooperative RF distance measuring techniques such as DME that indicate range directly at the point of use, such as the cockpit of an aircraft, but the technique requires the use of a ground transponder in its operation. These RF systems are not passive and thus have grave limitations in military applications such as in tactical situations where radio silence is mandated. In addition, pulsed RADAR techniques have range limitations since electromagnetic radio waves move at a rate of approximately a foot for each nanosecond of elapsed time. Therefore, measuring down to ranges of a few inches or to an accuracy of fractions of an inch at a range of a few feet present problems with presently available equipment. There are phase-coherent RADAR systems that have the desired capability; however, the logic required to process a complete 3-D scene to identify and store x, y, z, or other coordinates for each object in the scene in almost real time presents formidable problems.

Range finders of the stereoscopic class, usually having an arrangement of optical elements such as mirrors or prisms constructed to give a rapid mechanical solution of a triangle having the target at its apex and the range finder at one corner of its base, are also well known in the prior art. With the advent of electrical transmission of visual scenes by wired or wireless systems, the technology has become available for the use of electronic means to extend the capabilities of rangefinding systems and reduce the number of expensive optical elements required for the purpose. Further, the use of electronic image forming means makes it possible to use frequencies of the electromagnetic spectrum outside the visual range. Because of these factors, development of stereoscopic range finders utilizing cathode ray TV tubes, image storage tubes, Charge Coupled Devices (CCD) solid-state imaging technology, and similar electronic image forming means, in their operation has been undertaken. The ranging system of the present invention is of the class of rangefinders utilizing stereoscopic electronic imaging technology.

Television combined with the power of digital processing systems that are commercially available at the present time make the approach of the present invention for ranging on objects in a viewed scene highly effective. Targets in a scene being ranged on can be completely passive and noncooperative and accuracy down to fractions of an inch are possible. Imaging systems commercially available from a number of manufacturers (such as Colorado Video, Inc., Hamanatsu, General Electric, and others) digitize video output for microprocessor manipulation.

For completely passive noncooperative ranging, two TV stereo views must be stored. If processing starts after the storage of both TV frames, assuming that both stereo TV frames are stored at the same time, an interval of 1/30 of a second will have elapsed. Even for relatively simple processing algorithms, fractions of a second to several seconds must be added to the 1/30 of a second TV frame acquisition time before range data is available.

The automatic ranging system of the present invention does not use a microprocessor for the range solution because it is too slow. However, a microprocessor is used to apply the range solution to a particular application. Logic functions in the system are served by conventional hard-wired TTL (transistor-transistor logic). Logic-circuits provide range data in less than 200 microseconds after a TV line is scanned. Range to every change of contrast in the common stereo scene is stored in a RAM (random access memory). The RAM address is the x-y coordinate of the range information. Therefore, x, y, and z coordinates to all objects in the scene are available for processing.

3. Description of the Prior Art

Stereoscopic ranging systems utilizing electronic image forming means are disclosed in the prior art by J. J. Redmann (U.S. Pat. No. 3,706,493) and R. Gerharz (U.S. Pat. No. 3,961,851). In Redmann, at least two optical systems whose axes are separated by a known distance contain lenses for focusing rays from a source onto an image retaining surface. Apparatus is provided for determining the angular position of the radiation source with respect to the optical systems axes such that the range of the source can be calculated. Gerharz discloses a system having at least three TV cameras in which the two TV cameras having the greatest baseline separation are utilized to produce superposed image frames. An electronic correlator makes use of the separation of two consecutive points in the superposed image frames to perform the range analysis function automatically.

SUMMARY OF THE INVENTION

In this invention, ranging to remote, passive objects such as a point, a silhouetted object, details of an object, or a number of objects is accomplished by measuring the parallax displacement in two stereo images of a scene containing the passive objects.

Any suitable light-sensitive imaging system can be used to produce a pair of side-by-side stereo images of a scene containing the object being ranged. Scanning means appropriate to the imaging system used are used to scan the stereo images on a line-by-line basis to produce output signals proportional to the light values or equivalent characteristics of elements constituting the images. Hard-wired digital logic provides outputs to a supervising microprocessor that is not a necessary part of the system. To reiterate, in this invention, the images are not superimposed as in conventional stereo-ranging systems, but two side-by-side images of the scene are used. Parallax displacement is obtained by measuring the delay from the left or right side of each image to an identical corresponding point in each of the images during each line scan. Each scan line is divided into a predetermined number of scan points, for example, 500 scan points for each scan line. Measuring is accomplished by counting the number of scan points in each of the stereo images from the left side or the right side thereof to obtain parallax displacements of the object in the two images. From this measured displacement, the range to the object or a point on the object as well as its off-axis displacement, is obtained. If this is done on a number of points on the face of an object being viewed, orientation can be sensed. Periodic updates of ranges to each point on the object will permit range rate and object rotation rate, if any, to be determined by the associated microprocessor. Off-axis information of a point on the object can be converted to azimuth and elevation angle to the point, and changes in off-axis position can be converted to azimuth rate and elevation rate information.

Man and other animals having binocular vision gauge range effortlessly because there is a relative displacement of the images focused on the retina of each eye. This displacement is resolved by the brain down to the dimension of a rod or cone of the retina and is converted to range. This two-eye-brain ranging is emulated in this invention by measuring small displacements of corresponding points in a stereo image pair. From these small measured displacements, range to a point in question is obtained.

An insight into the role that stereo displacements play in depth perception or ranging may be seen from FIGS. 1a and b. As shown in FIG. 1a, the field-of-view (FOV) of the left (L) camera 10 is shown as solid lines subtending angle $\alpha$. A TV monitor connected to this camera will show widths $W_1$, $W_2$, and $W_3$ as the same full width of the TV monitor screen even though these widths are at different ranges. Since each of these widths $W_1$, $W_2$, and $W_3$ are associated with a specific range $$R = \frac{W}{2 \tan\left(\frac{\alpha}{2}\right)} \quad (1)$$

the range R can be determined if the width W is determined. If a second TV camera 12 is added to form a stereo-pair, a means of determining W exists if some unique point P is present on it. The FOV of the second camera 12 is shown in dotted lines and is displaced a distance d to the right of first camera 10. As shown in FIG. 1a, an equivalent distance d is introduced that is constant at all ranges, and this distance can be used to measure W, and from Eq. 1, range R.

If the TV line is divided into C equal parts (typically, C=500 for each stereo view), and if the delay in counts is measured from the left side of each stereo view for any unique point P on $W_3$, the value of $W_3$ and therefore $R_3$, the range to unique point P, can be determined. If l equals the counts in the L stereo view and r equals the count in the R stereo view, then their difference $\Delta = (l \times r)$ is seen, as indicated in FIG. 1a, to be equivalent to the distance d and $$\frac{\Delta}{C} = \frac{d}{W} \quad (2)$$

combining Eqs. 1 and 2 the range to point P is determined $$R = \frac{dC}{2\Delta \tan\left(\frac{\alpha}{2}\right)} = \frac{K}{\Delta} \quad (3)$$

where $$K = \frac{dC}{2 \tan\left(\frac{\alpha}{2}\right)} \quad (4)$$

is a design or system parameter and is shown plotted in FIG. 2. Since $\Delta$ can vary from 1 to C, $R_{max} = K$, and $R_{min} = K/C$ and $$\frac{R_{max}}{R_{min}} = C \quad (5)$$

If a greater range ratio than C is desired, the value of K for each range must be changed. A practical way of implementing this is to change $\Delta$ only in Eq. 4 by mechanically moving a pair of different lenses before the stereo cameras to change the range ratio.

If only one unique point P in the scene is present, then determining the range in accordance with Eq. 3 is straightforward. If, however, P is an object rather than a point, complications are introduced in the range determination because it is necessary to determine identical points in both stereo views to measure l and r. It will be apparent that if many objects are introduced into the scene and if the objects are located at different ranges, greater difficulty is experienced in identifying a particular point in both stereo views.

Identification of a particular object in both stereo views is expedited by the fact that the object will appear almost identical in both stereo views. Therefore, substantially identical amplitudes of the video voltage, same widths, and identical slopes (with the same sign) can be looked for in both views. Once an object has been identified in both stereo views, the location of a particular point on the object in both stereo views is readily accomplished.

The angle $\alpha$ in FIG. 1a is usually smaller than the viewing angle of the camera lens because the rectangular TV raster generally fits within the viewing cone of the lens. The angle $\alpha$ can be measured directly with the lens-camera combination from the raster equivalent width of a horizontal line located at a known distance in front of the lens.

If the optical range finder arrangement illustrated in FIG. 3 is used, the required stereo-image pair can be obtained with a single TV camera 14. The images are not superimposed as in conventional range finders, but instead the four mirrors 16, 18, 20, and 22 are held rigidly in place to provide two parallel lines-of-view 24 and 26; spaced distance d apart. The split TV screen changes the aspect ratio and FOV. Some of these side effects are avoided and some additional advantages are realized by using two cameras. A two camera arrangement is thus preferred. Also, because a linear sweep is difficult to realize and maintain with conventional vidicon-type cameras, it is preferred to use two solid state CCD-type TV cameras which eliminate the problem of sweep linearity.

The use of two TV cameras requires that extreme care be exercised in the relative positioning of the stereo-cameras. Specifically, both scans are shared and the TV line scanned in both cameras should be co-linear. These requirements dictate a vernier translation and rotation adjustment of one of the cameras relative to the other. The direction of the resultant TV stereo scan determines the direction of the x-axis.

Field Of View

Each camera has a width of field W at a particular range which will be referred to as FOV. A stereo-camera pair has the FOV reduced to (W-d). Substituting Eqs. 1 and 2, it is found $$FOV = d\left(\frac{C}{\Delta} - 1\right) \quad (6)$$

At $R_{min}$ where $\Delta=C$, FOV=O and, at $R_{max}$ where $\Delta=1$, FOV≈Cd. These results are not dramatically different than a conventional camera where an object appears ever larger as the range is reduced. When the width of an object is equal to the FOV, it then fills the entire width of the display and, for shorter ranges, the entire object is not viewed but rather smaller regions of the object fill the entire width of the display.

The viewing angle α of the stereo system is the same as of the individual cameras (FIG. 1a) and is determined by the lens in front of the cameras. The consequence of the $R_{min}=K/C$ places the minimum range in front of the cameras by this amount rather than somewheres inside the compound lens as is the case for a single camera. For some applications, this condition is desirable. For example, in an application in space in a space-docking situation, the connecting mechanism used for docking protrudes a foot or two in front of the docking vehicle carrying the stereo-cameras and thus ranging during the docking operation presents no problems. If it is required to range to a surface on the vehicle carrying the stereo-cameras, the cameras will have to be recessed into the vehicle by the value of R min.

Range Resolution

If Δ is measured with an error of ±1 count, it is seen that this precision in counting represents a different accuracy as well as a different percentage error depending on the value of Δ. For example, at maximum range where $\Delta=1$, a +1 count error represents a 100% error and a factor of two change in range. For minimum range where $\Delta=C=500$, a (−1) count error is a 0.2% range error. However, this is a smaller percent error of a smaller range and a dramatic change is seen in range accuracy as a function of range. Fortunately, the greater range accuracy occurs at minimum range. If a±1 count error is assumed in measuring Δ, there is then a relative error E given by $$E = \frac{100}{\Delta} = \frac{100R \%}{K} \quad (7)$$

The error is linearly related to range but it can be reduced by designing the system Eq. 4 for a larger value of K. The largest range can be limited to be within a 10% error where from Eqs. 3 and 7

$$\frac{R_{10\%}}{R\ min} = \frac{C}{10} = 50 \quad (8)$$

and the maximum range for a 1% error is seen to be $$\frac{R_{10\%}}{R\ min} = \frac{C}{100} = 5 \quad (9)$$

In general $$\frac{R_E}{R\ min} = \frac{EC}{100} = 5E \quad (10)$$

and $$R_E \leq 5ER_{min} = \frac{EK}{100} \quad (11)$$

where $R_E$ is the range for maximum error E. Therefore, for smaller counting errors, more range scales will be required over a given maximum to minimum range. From Eqs. 3 and 7, it is seen that both the percentage counting error and the range are reciprocal functions of Δ. At minimum range, the error in range is seen to be $K/\Delta^2$. For typical values of: α=25°, C=500, d=6 in., it is found $R_{min}=K/C=13.53$ in. and the error E=0.2% or 27 mils. To reduce this error, a smaller value of d or a larger value C or α is required.

Relative Motion Consideration

Under normal operating conditions, there are rarely situations in which all objects are static; either the target is moving or the platform of the stereo camera is moving. To compute range with any accuracy, the computation time must be negligibly small compared with the time for relative changes in the scene. Because of the velocities encountered in normal operations, the data processing required would be almost impossible conventionally with anything less than a huge parallel processor. The present invention obviates the requirement for a huge processor by the use of a technique in which fast events are latched or stored as they occur, (freeze time), and processed at a rapid rate. The system endeavors to store events as they occur by storing the L and R TV lines of video as they are scanned. This presents difficulties because both the L and R TV scan lines do not see an object at the same time; there is a time difference corresponding to the count difference Δ. During that time difference, a fast moving object or motion of the platform carrying the ranging system can introduce an error. As might be expected, the error will be a function of range.

To evaluate system sensitivity to object motion, a worst case scenario will be considered. In this case, the object velocity v-mph (or 1.4667 v ft/sec) is across the FOV along W in FIG. 1a. The count of C across the display in FIG. 1b divides the FOV into W/C feet and each of these distances is the width of a pixel. At 100 ns/pixel (corresponding to C=500), the FOV is scanned at a $W/C \times 10^7$ ft/sec rate. If the object velocity is 1/Δ of this scanning rate, then there is only one count velocity error in any Δ measurement, corresponding to a particular range R. Combining these considerations with Eqs. 2 and 3, the velocity corresponding to a one-count error in Δ is found.

$$v = d\left(\frac{R}{K}\right)^2 6.8182 \times 10^6 \quad (12)$$

where
v=mph
d=feet
R and K are consistent units
For the example given above where: α=25°, C=500, and d=0.5 ft, K is found to be 563.8386 ft and the critical one count velocity error is tabulated for different ranges.

| R in feet | v in MPH |
|---|---|
| 1.128 ft = K/C = $R_{min}$ | 13.6 |
| 3.05 | 100 |
| 6.83 | 500 |
| 9.65 | 1,000 |
| 563.8 ft = K = $R_{max}$ | 3.41 × 10$^6$ |

It is apparent, therefore, that relative motion must be removed to realize the improved range resolution at minimum range. Thus, in operational conditions such as a space-docking situation, all relative motion between the vehicle carrying the ranging equipment and the satellite or spacecraft should be accomplished at ranges beyond 10 ft (for a system in which K=563.8 ft) where the ranging system is velocity insensitive.

With the ranging system of the invention, it is possible to separate and identify individual objects, and to determine for each individual object its range, its size-height and width, and its location in the FOV-x,y. Further, by updating this information every TV frame of 1/30 sec for all objects in the FOV, rates of changes of those parameters are provided.

Because processing is on a TV line basis, hard-wired logic is used. An optional microprocessor is employed to process, make decisions, and display or output the range data generated. The microprocessor can examine all objects at the same range that are touching (approximately same coordinates) to determine if they are parts of the same object. An example of this could be the legs of a table or chair.

It is thus a principal object of the invention to provide a TV ranging system for precise, quantitative stereo-ranging to non-cooperative, passive remote objects.

A further object of the invention is to provide a TV ranging system in which range determinations are accomplished by measuring the parallax displacement in two TV stereo-views of a scene containing the passive, remote target.

It is another object of the invention to provide an automatic TV ranging system in which range is determined by measuring changes of contrast in the common TV stereo-scene and, further, to provide a system in which the processing of the video is accomplished with a three TV-scan line delay of less than 200 microseconds.

Yet another object of the invention is to provide an automatic TV ranging system in which the parallax spatial displacements used to determine range are measured in terms of time delays.

A still further object of the invention is to provide an automatic stereo-ranging system which can be implemented with standard TV cameras and logic circuit elements.

Other objects and advantages will become apparent from a reading of the Specification and a study of the accompanying drawings.

DESCRIPTION OF THE DRAWINGS

For the purpose of illustrating the invention, there is shown in the drawings the forms that are presently preferred; however, it should be understood that the invention is not necessarily limited to the precise arrangements and instrumentalities here shown.

FIG. 1a is a schematic top view of a single target in the stereo field of the TV stereo-ranging system of the invention;

FIG. 1b is a diagrammatic view of the L- and R-stereo pair showing the FOV as seen on TV monitors of the diagram of FIG. 1a;

FIG. 2 is a plot of design parameters of the TV stereo-ranging system embodied in the invention;

FIG. 12b is a diagrammatic view of the stereo-image pair of the FOV as seen on TV monitors of FIG. 12a;

FIG. 13b is a diagrammatic view of the stereo-image pair of the FOV as seen on TV monitors of FIG. 13a.

DESCRIPTION OF THE PREFERRED EMBODIMENTS

Figure 4:
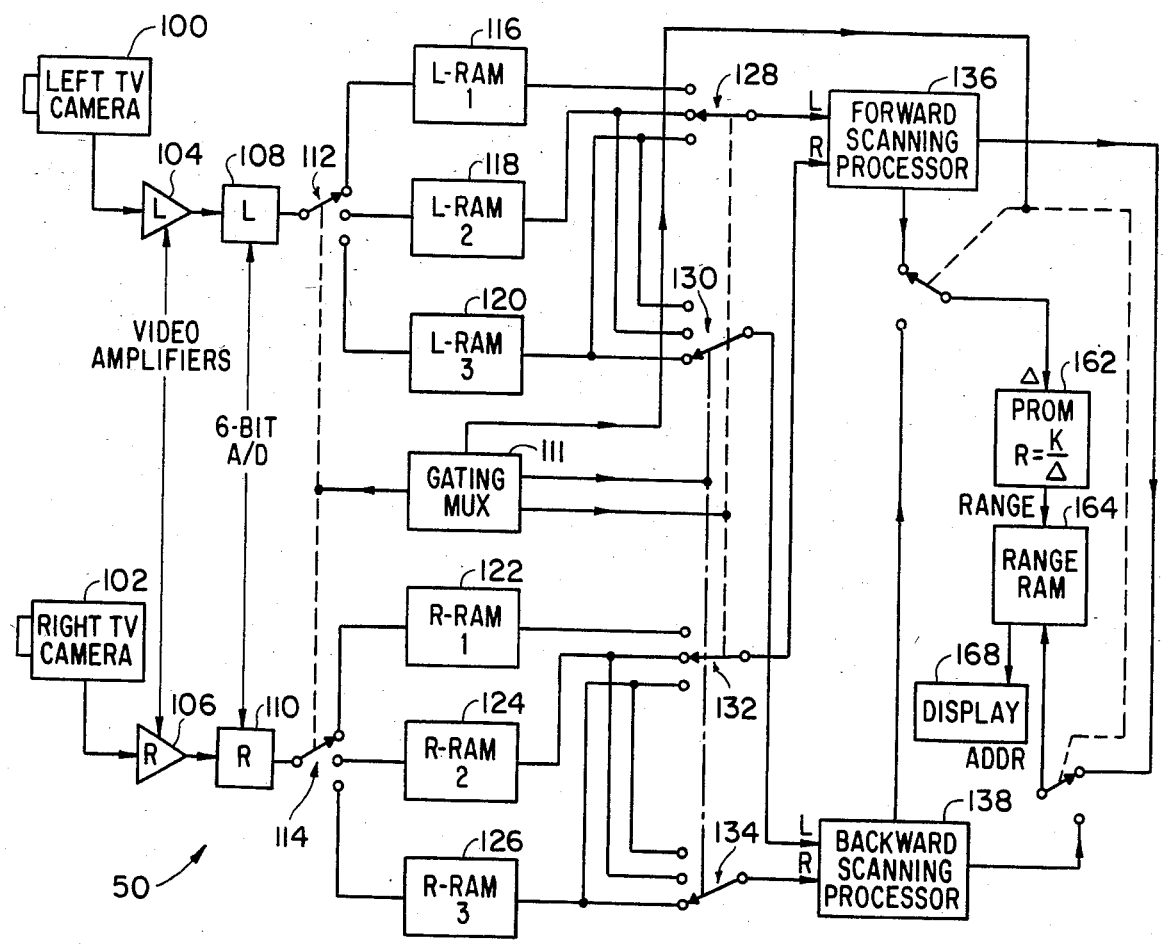
FIG. 4 is a functional block diagram of a preferred embodiment of the TV stereo-ranging system of the invention.

A preferred embodiment of the ranging system of the invention is illustrated in FIG. 4. System 50 has a left-hand TV camera 100 and a right-hand camera 102 as the imaging means. Preferably the two TV cameras are of the Charge-Coupled Device (CCD) solid state type rather than a vidicon type. The CCD cameras avoid sweep linearity problems and their time base is divided into discrete time intervals per each picture element (pixel). Slaving of the sweep circuits of the two TV cameras is therefore quite straightforward. The outputs of TV cameras 100 and 102 are amplified in video amplifiers 104 and 106 and are then passed to analog/digital (A/D) converters 108 and 110 respectively. Each video amplifier has a bandwidth of 10 Mhz to accommodate rapid video changes, up to a pixel at a time. Also the amplifiers have a gain of slightly less than 10 to interface the one-volt maximum TV camera output to the input maximum range of the A/D converters 108 and 110. Automatic gain matching of the TV cameras is accomplished in the video amplifiers. To sample and convert each analog pixel video voltage to a digital number, the A/D converters have a sampling rate above 10 Mhz. Suitable A/D converters are the CA3300D CMOS units manufactured by RCA. Those units have a 15 Mhz sample rate (66 ns—conversion time) with six parallel output digital lines. Six bits division of the one volt video out of the camera is equivalent to 64 divisions or 15.6 mv amplitude increments or −36 db. Therefore, if the camera-op-amp signal to peak noise ratio is approximately 36 dB, all 64 divisions (all 6 bits) are useable. The table below relates signal-to-noise (SNR) to useable bits of amplitude.

| Bits | Divisions | mV/Div | SNR-dB |
|------|-----------|--------|--------|
| 6 | 64 | 15.625 | 36.12 |
| 5 | 32 | 31.25 | 30.10 |
| 4 | 16 | 62.5 | 24.08 |
| 3 | 8 | 125 | 18.06 |
| 2 | 4 | 250 | 12.04 |
| 1 | 2 | 500 | 6.02 |

The CA3300D unit also has an overflow line that can be used to indicate TV saturation. A gating multiplexer (GATING MUX)111 provides an appropriate switching function (indicated in FIG. 4 as physical switches 112 and 114) to switch the output of the A/D converters 108 and 110 to their respective 6 bit×512 random access memories (RAM's) or stores 116, 118, 120, 122, 124, 126. The output of the L-A/D converter 108 is switched as required to the L-No. 1 RAM 116, L No. 2 RAM 118, and L No. 3 RAM 120; and the output of the R A/D converter 110 is switched as required to the R No. 1 RAM 122, R No. 2 RAM 124, and R No. 3 RAM 126. It will be appreciated that the designation of "left" and "right" in this exposition of the system of the invention refers to components involved in the processing of the left hand and right hand images respectively of the stereo images. GATING MUX 111 also provides an appropriate switching function (indicated in FIG. 4 as physical switches 128, 130, 132, and 134) to access the RAM's to a forward scanning processor (FSP) 136 and a backward scanning processor (BSP) 138.

Figure 5A:
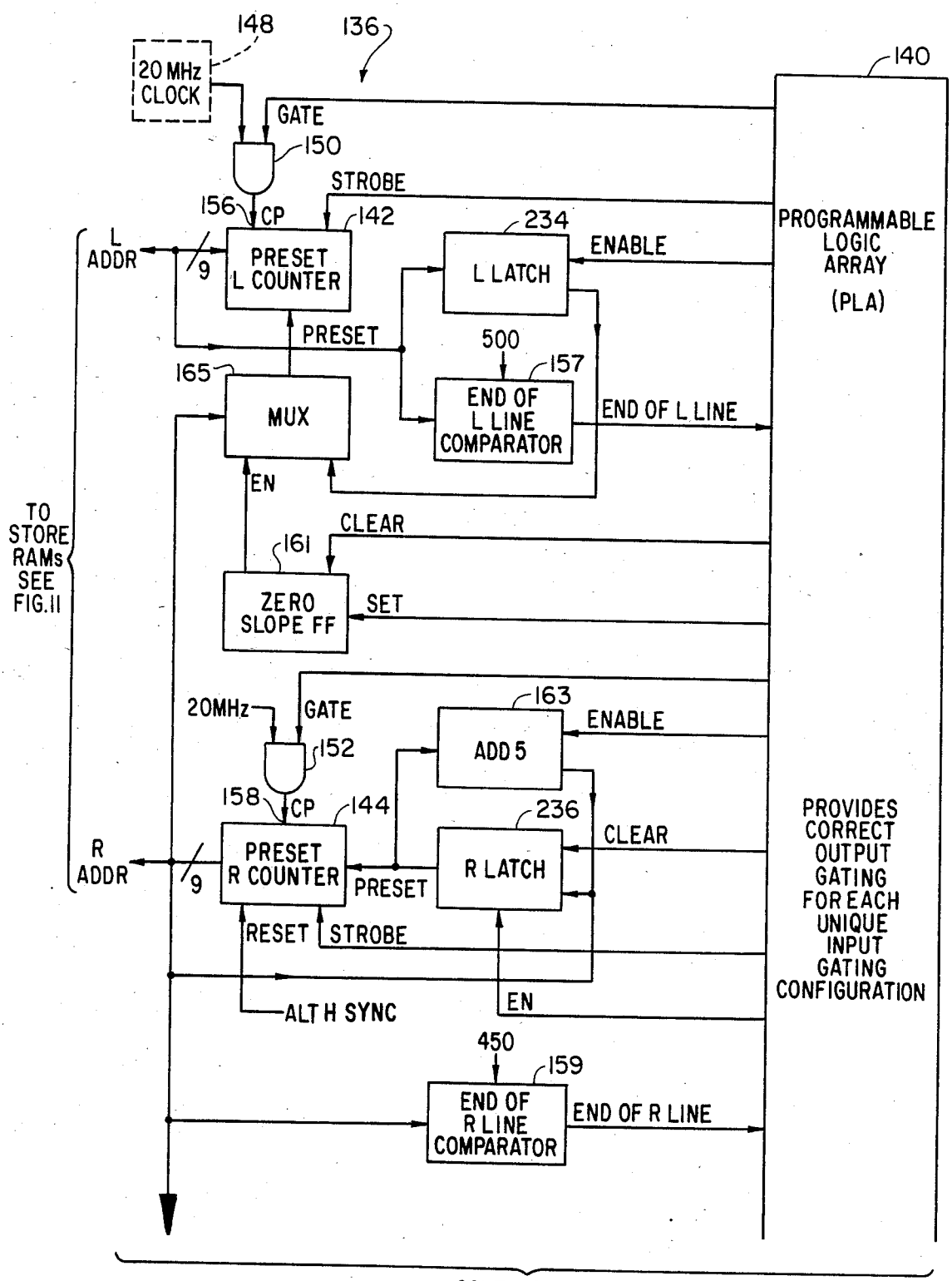
FIGS. 5a and b is a circuit diagram of portions of the system of FIG. 4.
Figure 5B:
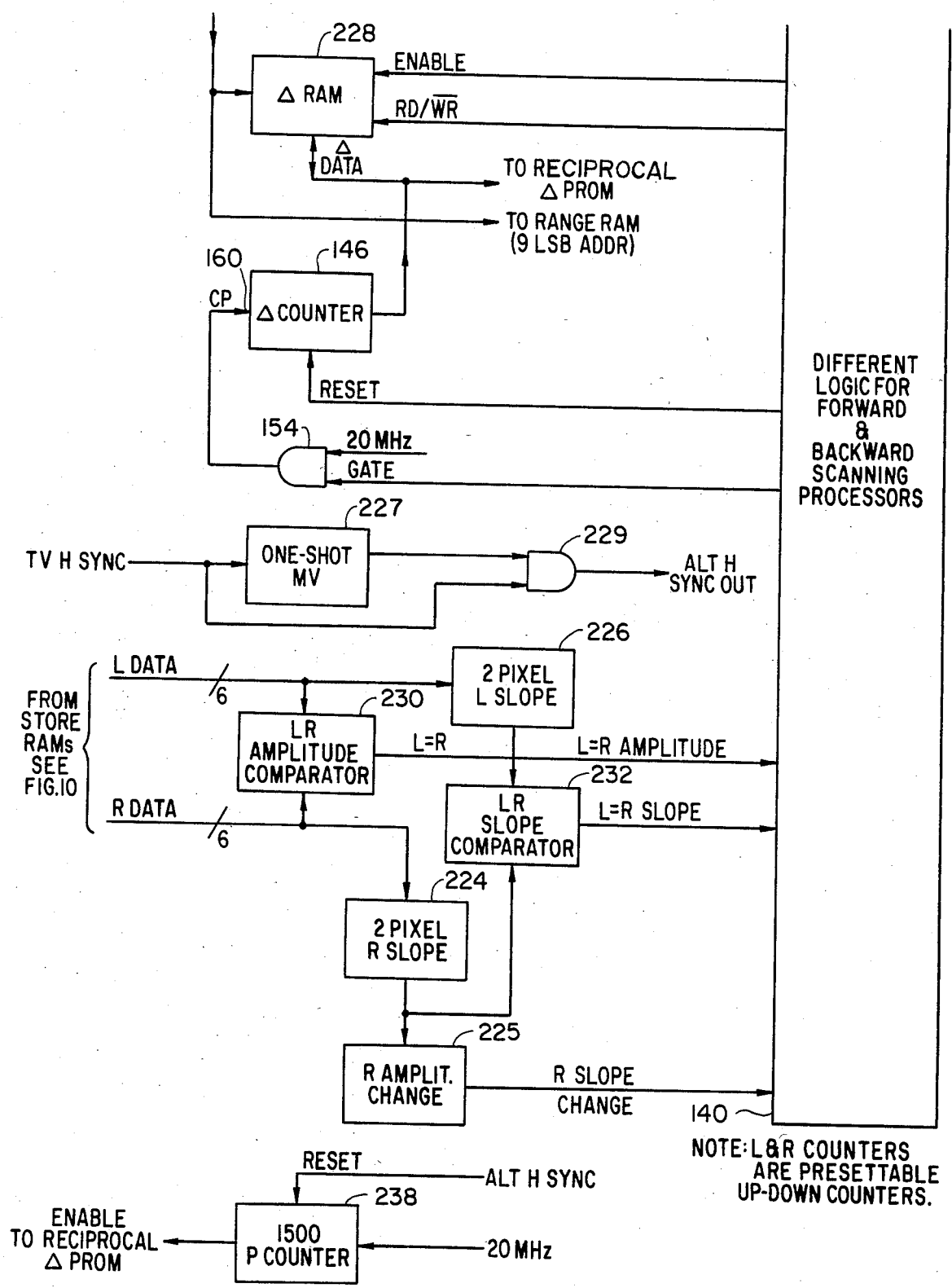
Figure 6A:
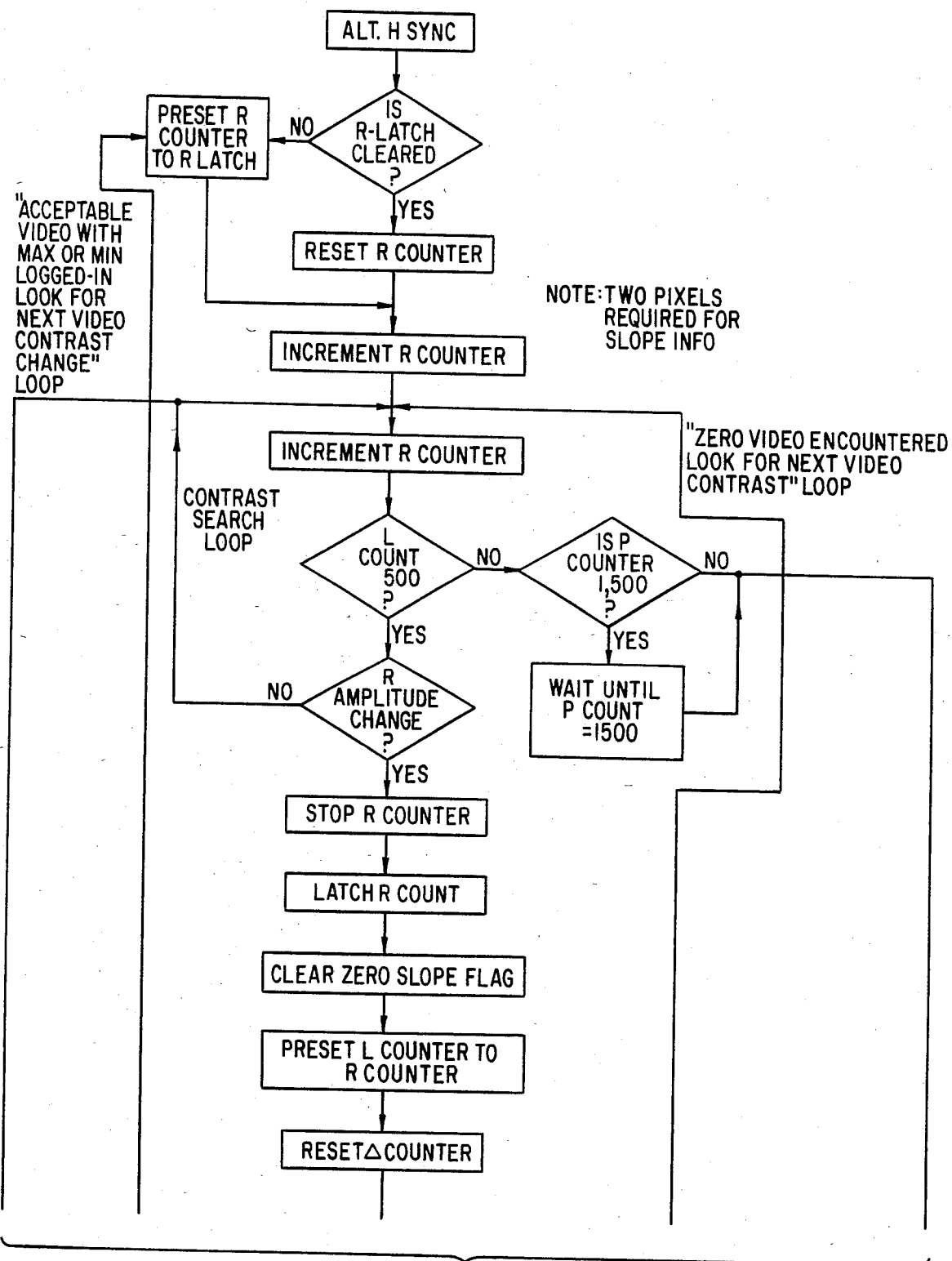
FIGS. 6a and b is a logic flow diagram of the processor logic of the invention.
Figure 7:
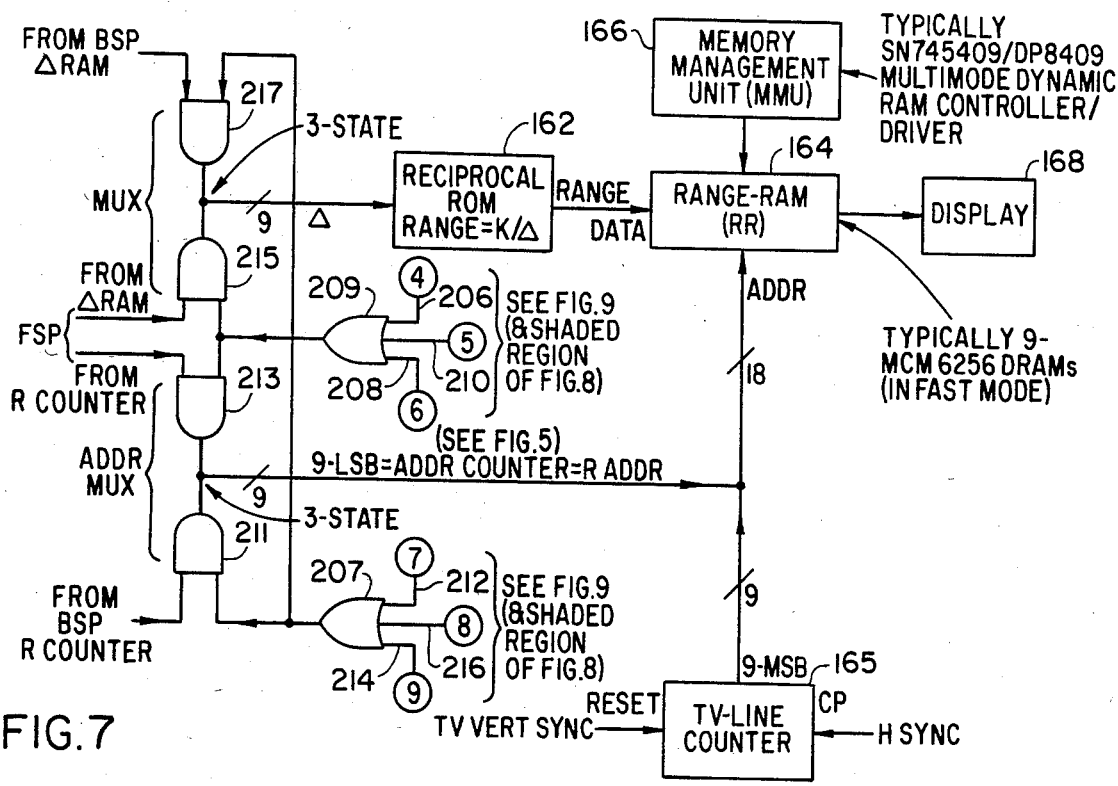
FIG. 7 is a circuit diagram of the Δ-Range conversion of the system of FIG. 4.

The digitized video of the left (L) and right (R) TV camera sweep-slaved scan lines are stored simultaneously in the RAM's 116 and 122, simultaneously in RAMS 118 and 124 and simultaneously in RAMS 120 and 126. This results in faster processing which is limited only by the time requirements of processors 136 and 138. If relative motion between the ranging system and the objects being ranged is to be accommodated, simultaneous scan line storage is mandated. Three pairs of L-R storage RAM's are provided to allow adequate time for processing the L and R stored video. Scanned L and R TV video lines are stored as they are scanned from the L to the R side of the TV raster. In the write (store) mode, L and R RAM pairs are addressed in sequence with address zero corresponding to the L side of the TV raster and address 499 corresponding to the R side of the TV raster. Once stored, however, the RAM can be read out in any order L to R or R to L or even randomly by correct addressing. Processors 136 and 138 provide for reading out or scanning of the RAM's in opposite directions. To address the store RAM's in reverse order, a presettable, incremented or decremented, up-down counter is provided and the L and R RAM's can be addressed in both directions. FIGS. 5a and b is a circuit diagram of FSP 136 and a programmable Logic Array (PLA) 140 is used to switch in each function in accordance with the flow diagram in FIGS. 6a and b. As shown in FIG. 5a, end of L line 9-bit comparator 157 and end of R line 9-bit comparator 159 provide an input into PLA 140 and the switching circuit therefrom includes a zero-slope flip-flop 161, a 9-bit adder 163, and a 9 line to 9 line multiplexer 165. An identical circuit as shown in FIGS. 5a and b is used for BSP 138; however, a different logic from that shown in FIGS. 6a and b for the FSP is used for the BSP. In the processor of FIG. 5a, preset L counter 142 and preset R counter 144 in FIG. 5b and Δ counter 146 are provided. These counters are gated on and off by gating a 20 Mhz clock 148 on or off by means of the AND gates 150, 152, and 154 to their cp inputs 156, 158, and 160. The outputs of FSP 136 and BSP 138 are passed to Reciprocal ROM (Range=K/Δ) 162 and Range RAM(RR) 164 in FIG. 4. In the RR 164, each bit of range can be supplied by a MOS N-channel, Silicon-gate 262, 144 bit dynamic RAM, typically a MCM6256, a 16-pin DIP (dual-inline-package). Nine-bit accuracy range will require nine of these DIP's. The eighteen-bit addressing required for a 250,000 memory is realized in the MCM6256 by on-chip multiplexing the nine address pins provided. Address latches are located on the chip. As indicated in FIG. 7 illustrating the circuit components involved in Δ-range conversion and range storage, a memory management unit (MMU) 166 is provided for the Range RAM 164. Typically MMU 166 is a multi-mode dynamic RAM controller/driver such as a SN74S409/DP8409 marketed by Monolithic Memories of Sunnyvale, Calif. The MMU provides the refresh for the range RAM 164 and all required multiplexing of line and row addressing for the RR. A 9-bit TV-line counter 165 provides an interlacing function for the RR. The range information stored in Range RAM 164 can be displayed on a suitable display 168 such as a TV monitor. The circuit also includes (shown in FIG. 7) 3-input OR gates 207 and 209 and 9-bit, 2-input AND gates 211, 213, 215, and 217. Typically, the 2-Pixel R slope circuit 224, the R amplitude change circuit 225, and the 2-Pixel L slope circuit 226 (FIG. 5b) comprise 6-bit latch and subtractors.

The system of the invention provides high-speed automatic quantitative ranging to any change in contrast in the TV scene being viewed. Range RAM 164 stores range for every change in contrast in the TV scene. Only change in contrast is ranged and zero video voltage is not ranged. However, logic is provided to speed up processing if the video is zero volts. A continuous check of all candidate video voltages from the L and R TV cameras, 100 and 102 respectively of FIG. 4, is made to determine the count difference Δ. Both amplitude and slope of the video voltages is used for the Δ measurement for each pixel. To eliminate errors, a match between L and R voltages is rejected as a candidate for a Δ measurement if there is no maximum or no minimum (zero slope) somewhere in the matching interval. To speed up processor time, a 20 Mhz processor clock rate is used rather than the usual 10 Mhz TV clock rate. In addition to the faster rate, the processor time will be two TV scan lines in duration. A one-shot multivibrator 227 in circuit (FIG. 5b) with a 2-input AND gate 229 provides an alternate synchronizing pulse to insure that processing lasts for a two TV line interval. Although the faster rate gives in essence a factor of four to process one TV L-R line pair, only a factor of three or a 1,500 count is realized because some time must be provided to store the range solutions. If processing has not been completed at the end of an allotted processor interval, that particular processor will continue processing at the same point on the TV line the next time it is used. A different L-R TV video scan line will be processed at that point in the scan line. However, since most objects subtend several TV scan lines and since objects in the scene and not pixels on the TV line are being ranged, no degradation in ranging to objects should be apparent. This situation is further relieved by the use of a reverse RAM scan in the other processor. In the ranging system of the invention, two processors time-share the stored video of three pairs of store L-R RAM's. This arrangement allows every TV L-R line pair to be processed in the time interval that the TV raster is scanned. The time of extra TV lines required by the processor at the end of each TV field can be provided by the vertical blanking interval.

Operation

Figure 8:
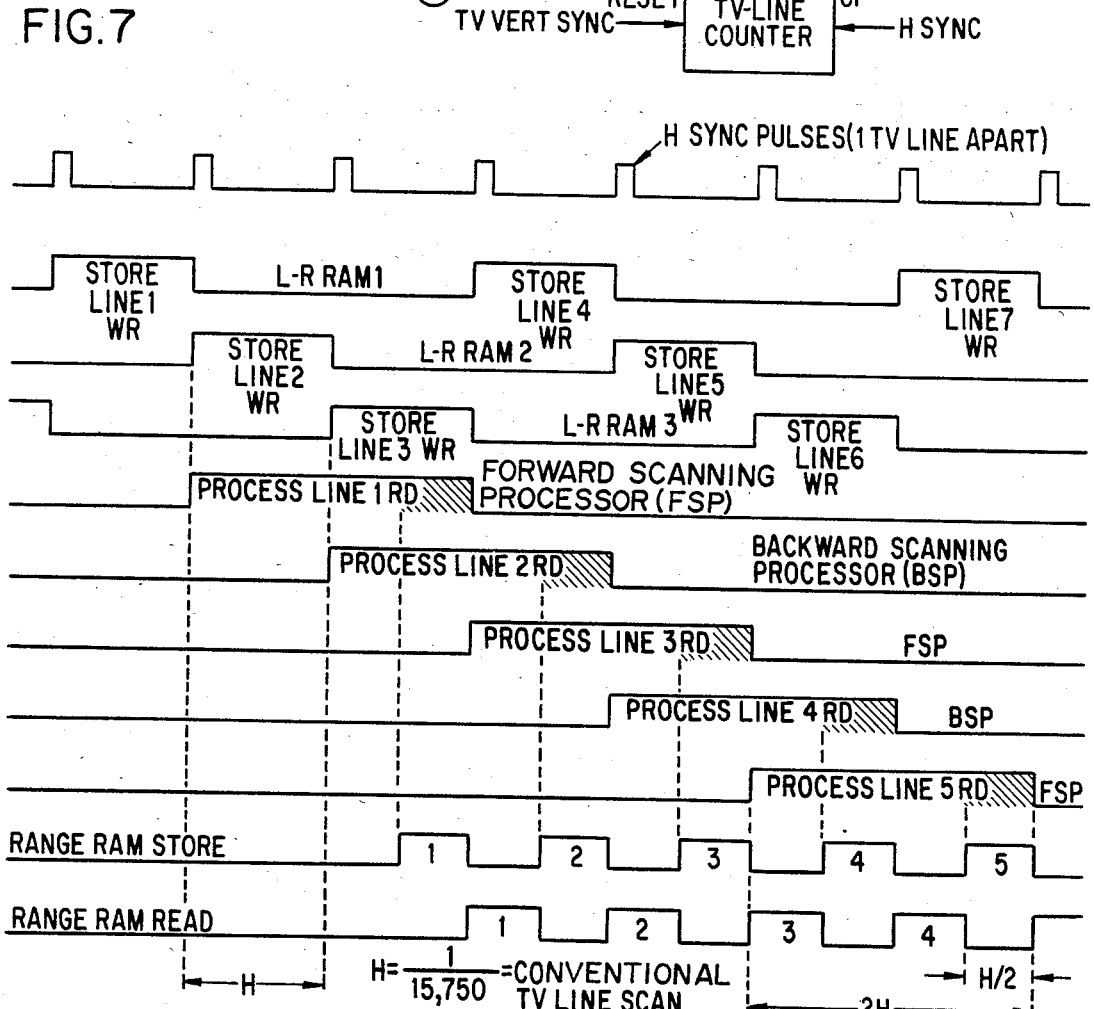
FIG. 8 is a graphical representation of various timing signals resulting from the operation of the store-processor means embodied in the present invention.
Figure 9:
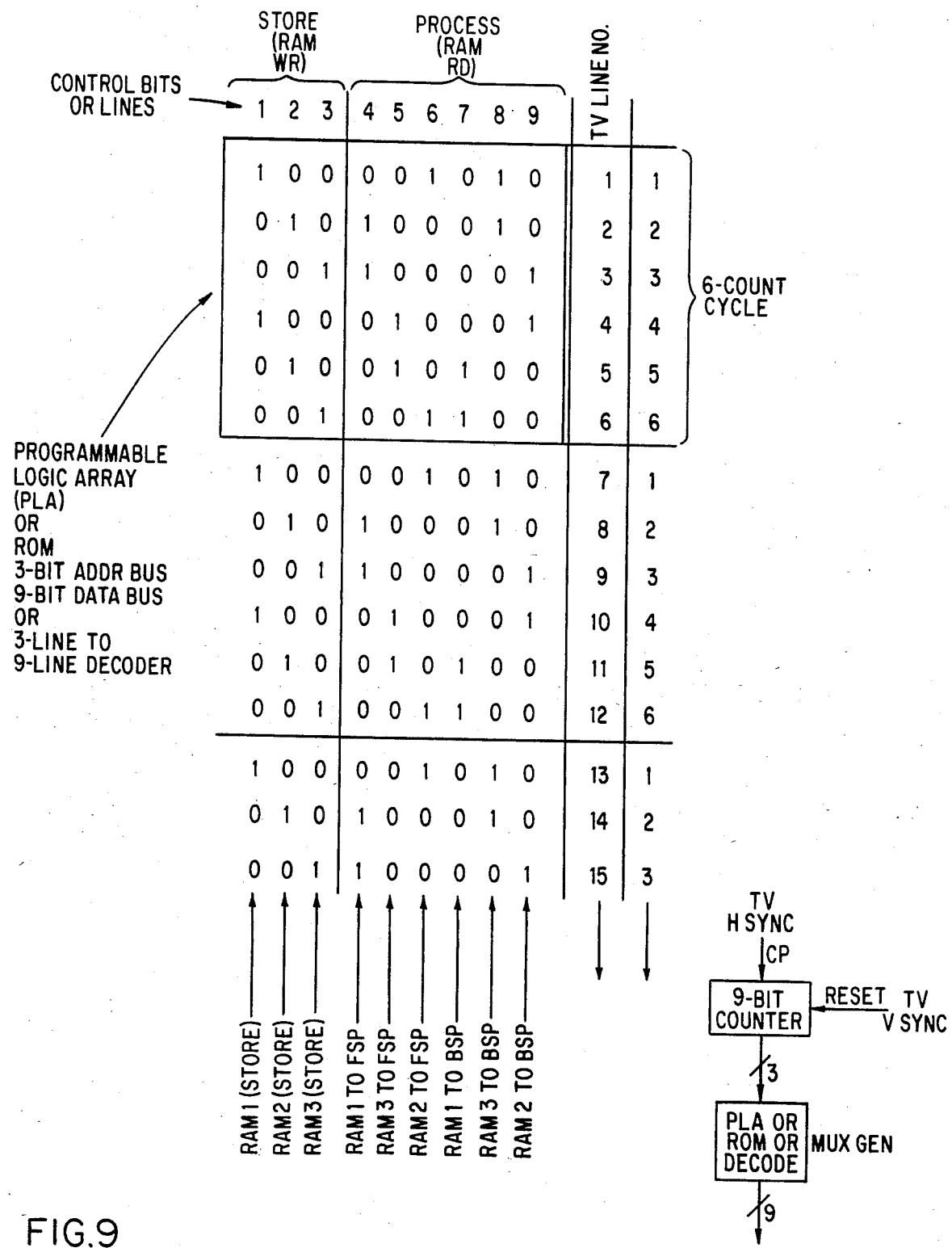
FIG. 9 illustrates the multiplex truth table of the TV ranging system of the invention.
Figure 10:
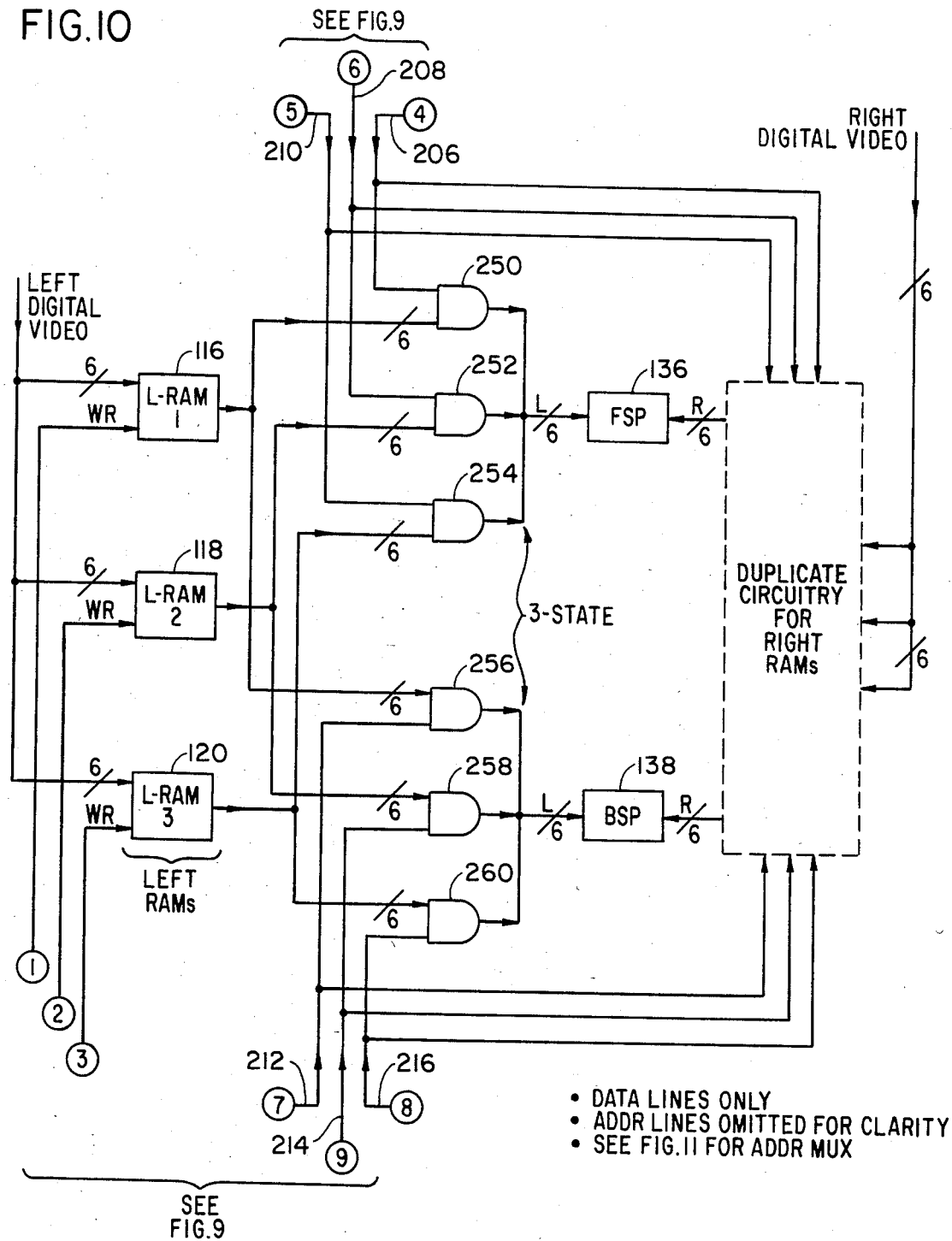
FIGS. 10 is the DATA MULTIPLEXING gate and 11 is the ADDRESS MULTIPLEXING gate circuit diagrams of portions of the system of FIG. 4.
Figure 11:
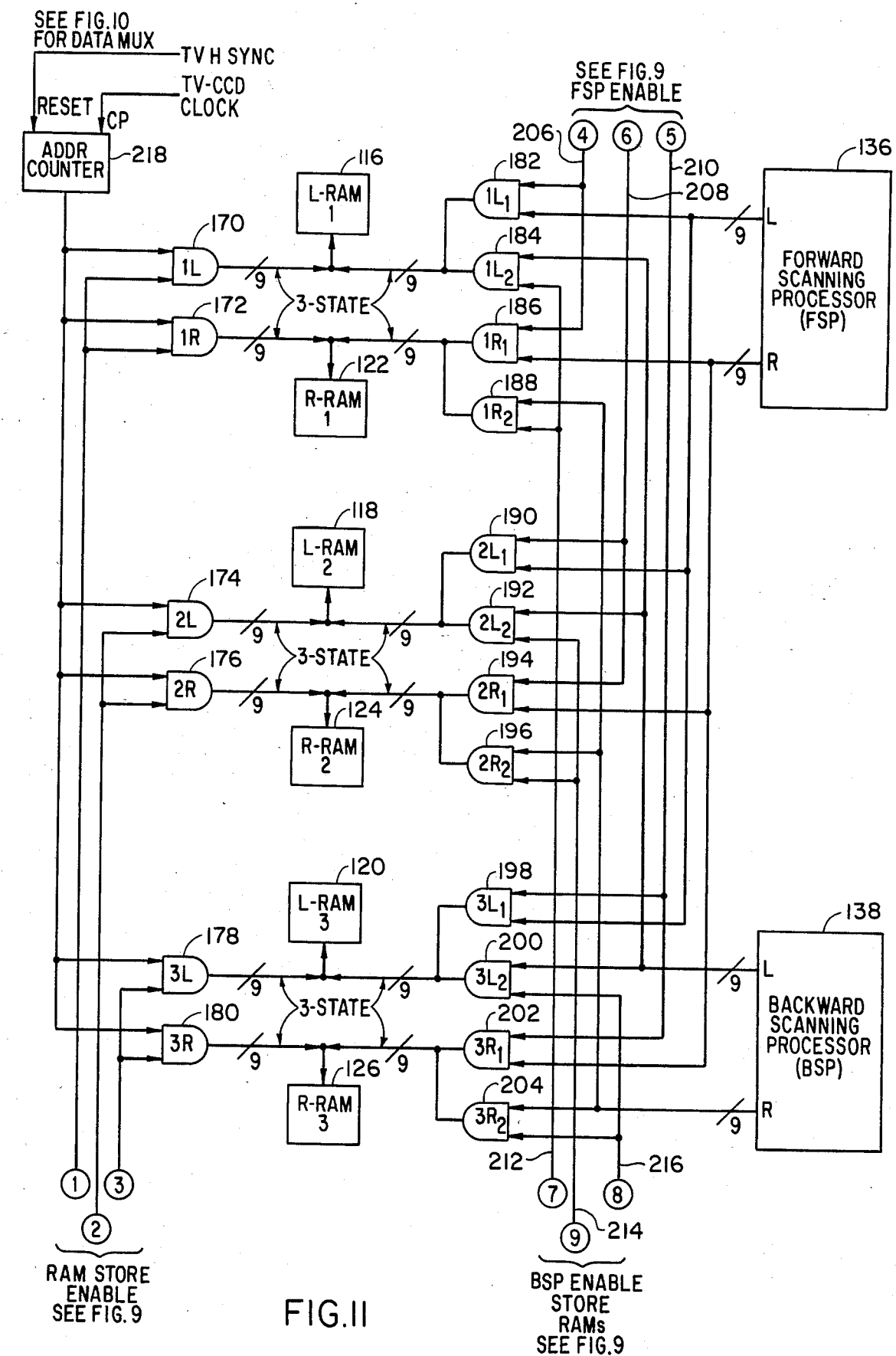

With reference to FIG. 4 which shows the circuit configuration of the system at the instant when No. 1 L-R RAM pair 116 and 122 is in the write or store mode and No. 2 L-R RAM pair 118 and 124 is in the read or process mode to FSP 136 and No. 3 L-R RAM pair 120 and 126 is in the read mode to BSP 138. The multiplexing for all switching and the time sequence of the GATING MUX 111 is shown in FIG. 8. A TV line L-R pair is stored in the next available L-R RAM pair at the same time the line pair are scanned by their respective cameras. During the same time, the two previous TV stored lines are processed in the two processors 136 and 138. The processor interval is seen to be 2 H or two TV lines in duration (H = 1/15,750 = conventional TV line scan time ≈ 63.5 $\mu$s). The last quarter (H/2) of this 2H interval is shown shaded in FIG. 8 and is also shown again referenced as RANGE RAM STORE. During this H/2 interval, the solutions are converted to range and are stored in the RANGE RAM 164 of the system. FIG. 9 shows the "truth-table" for generating the GATING MUX waveshapes of FIG. 8 that are shown as physical switches in FIG. 4. FIG. 10 shows the switching arrangement of the multiplexing gates for the Data lines and FIG. 11 shows those for the Address (ADDR) lines. In FIG. 10 separate input and output RAM data lines are shown for clarity. However, the same data lines preferably are used for both input and output. Thus, tri-state devices are provided on the line so that only one device is on the data line at a time. Multiplex switching using the logic of FIG. 9 is provided for the function. Each L and R RAM stores the 6-bit video amplitude of the 500 pixels of each TV line. Each of the six RAM's has a 9-bit ($2^9 = 512$) address bus and a 6-bit data bus.

Addressing of the L-R ram pairs provided by AND gates 170, 172, 174, 176, 178, and 180 in FIG. 11 differs for the storage (write) mode from the TV cameras and for the output (read) mode to the processors gated by the 9-bit, 2-input AND gates 182-204. In the store-write mode, both TV cameras are scanned together. Since the RAM address corresponds to the pixel position on the TV line, the RAM address bus of each L-R pair is tied together. In the process-read mode, however, each stored TV line is accessed separately on the R and on the L RAM pair to match up video voltage. Separate and different addressing of the L and R RAM's are therefore provided during processing. Gates 182-204 provide the separate addressing of the L and R RAM's. Each of the processors provides the L address from their L-counters 142 (FIG. 5a) and the R address from their R-counters 144. The three MUX 111 control lines 206, 208, and 210 connect one of the three RAM pair address-bus to FSP 136, the three MUX 111 control lines 212, 214, and 216 connects another of the three RAM pair address-bus to BSP 138, and the remaining RAM pair is addressed by the gates 170-180. Each RAM has three gates; i.e., RAM 116 (I-L) has gates 170 (IL), 182 (IL$_1$), and 184 (IL$_2$) on its 9-bit address bus. As indicated in FIG. 8, only one of these gates is on the bus at any time. And, as indicated in FIG. 10, each RAM has two 6-bit, 2-input AND gates on its data bus; for example, No. 1 L-RAM has gates 250, 256; No. 2 L-RAM has gates 252 and 258; and No. 3 L-RAM has gates 254 and 260.

Figure 12A:
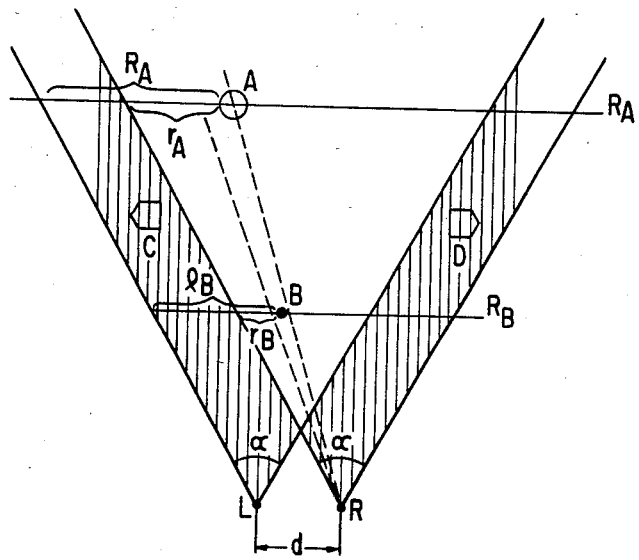
FIG. 12a is a schematic top view of multiple targets in a stereo field of the system of the present invention.
Figure 12B:
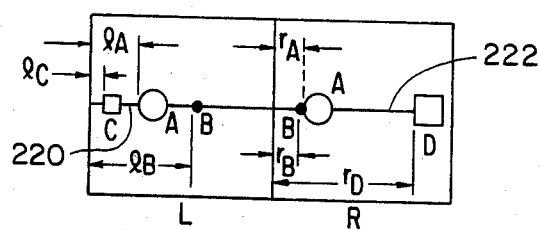
Figure 12C:
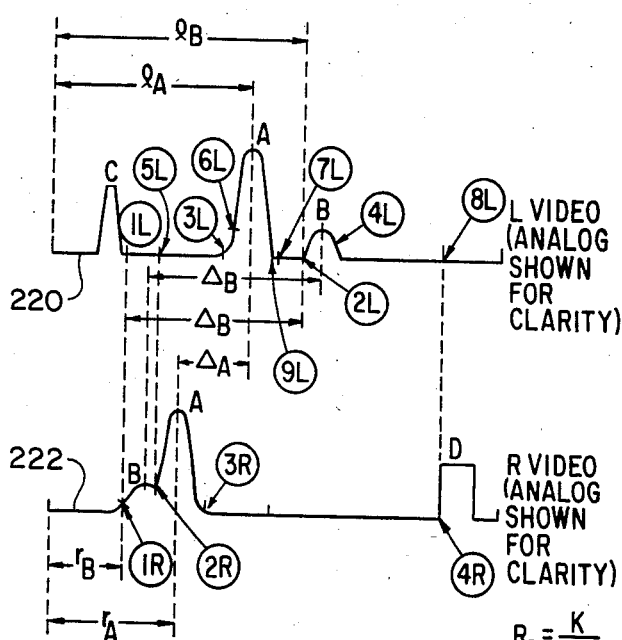
FIG. 12c is a graphical representation in an analog form of the video voltages generated during a single scan line of a scan of the FOV of FIGS. 12a and b.

With particular reference now to FIGS. 12a, b and c, the operation of processors FSP 136 and BSP 138 will now be described. It will be noted in the example shown in the drawings, that of the four objects A, B, C, and D in the scene, two of the objects, C and D, are not present in the FOV of both TV cameras. Object C is seen only by the L-camera and object D is seen only by the R-camera. In the example shown, the four objects are assumed to be located at the same horizontal distance up from the ground plane and all four objects therefore appear on the scan line through the center of the objects. Because of the difference in the size of the objects, all four will not appear on all of the same TV horizontal scan lines. This is reflected in FIGS. 12b and 12c for example, indicating the output of a single scan line through the center of all the objects. In the drawings, object B is shown darker to indicate that it has a lower intensity. Thus, it could have a negative-going voltage relative to the background; however, the positive-going voltage indicated in FIG. 12c shows that object B is brighter than the background. It will be seen that object B obscures part of object A in the R-camera only. It is also apparent from FIG. 12a that any object in the FOV of both cameras will be closer to the left side of the R-camera FOV than it is to the left side of the L-camera FOV or 1 > r for any object in the common FOV. In the example in FIG. 12b, $\Delta_B$ is measured from the leading edge of object B in both L and R, whereas $\Delta_A$ is measured from the center or peak of object A in both views. It will be appreciated that the value of $\Delta$ will be the same if the same corresponding point of the object is used in both L and R video voltages. In the following description of the operation of the processors, every point of the object visible in both L and R video views has a $\Delta$ measurement made and stored consistent with the considerations discussed previously herein.

In operation, TV video is generated for complete lines of video from both the L and R cameras. In FIG. 12b, the scan lines shown are through the center of the objects in the stereo pair. These scan lines are generated simultaneously and after amplification and analog-to-digital conversion are stored in their respective L and R RAM's as they are generated at a 10 Mhz clock rate. The store address of both L and R RAM's is generated by an address counter 218 (FIG. 11) that is clocked by the TV CCD clock and is reset by the H-Sync pulse of the TV. Each of the 500 pixels in the horizontal scale of the scan line of each stereo pair corresponds, therefore, to a unique sequential RAM address and the data stored at each RAM address is the digital equivalent of the analog voltage indicated in FIG. 12c for each pixel. During the processor intervals shown in FIG. 8, the L and R RAM addressbus are not tied together and the FSP has separate counters 142 and 144 (FIG. 5a) respectively for the L and R RAM pair at clock rates of double the RAM write clock or 20 Mhz. (Refer also to FIGS. 5a and b and to the Flow Diagram in FIGS. 6a and b). The present exposition describes the operation of FSP 136, but it applies equally with obvious differences to BSP 138.) Therefore, any point on the L-scan line 220 and on the R-scan line 222 of FIGS. 12b and 12c can be accessed independently by the FSP. If the FSP presets one of its address counters to the other, then the two RAM addresses are the same and voltages in FIG. 12c along a vertical line are available on the L and R data bus in digital format. This will be the condition at the start of the measurement of for any object in the scene.

Because an object in the scene appears first on the R-scan line (lower address count), initiation of a Δ measurement will begin on the R-video voltage. The R-counter in the FSP will be reset every other H-Sync pulse and counting will proceed thereafter at a 20 Mhz rate. A change in contrast in the scene triggers the Δ-measuring sequence. By digital sensing of the R-Slope in 224 (FIG. 5b) of two successive R-pixels, a positive or negative slope can be detected and will trigger a strobe pulse to preset L-counter 142 (FIG. 5a) to the count of the R-counter 144. The R-counter will be at an address corresponding to 1R in FIG. 12c and the L-counter will be at the same address corresponding to 1L. It will be noted that object C is to the left of 1L on the L-video and is not involved in the $\Delta_B$ measurement. At the same time, Δ-counter 146 (FIG. 5b) is set to zero. The R-counter 144 is stopped and the L-counter 142 and Δ-counter 146 are clocked at the 20 Mhz rate. Counting of the L and Δ counters 142 and 146 continues until point 3L (FIG. 12c) where the amplitudes at 3L and 1R are the same are reached. If the slopes at 3L and 1R are different, the L and Δ count continues until point 2L is reached. (The case where both the amplitudes and slopes at 3L and 1R are the same will be discussed subsequently.) At this point, the Δ counter 146 is stopped at the correct $\Delta_B$ count and the Δ value is written into Δ-RAM 228 (FIG. 5b) using the R-counter 144 as an address, i.e., point 1R in FIG. 12c. It will be seen subsequently that, if this stored Δ-RAM value is incorrect it will be over-written by the correct value at the same 1R address. The R-counter 144 starts counting at this point. There is, therefore, a stopped Δ-counter 146 with a count $\Delta_B$ and both L- and R-counters are counting. Processing precedes along on corresponding points of the digital equivalent video pulse B (FIG. 12c) out of the L and R RAM's. At each point along the trace each count of the L- and R-counters), the value of $\Delta_B$ is written into the Δ-RAM at the R-count address. The amplitude and the slopes of both the L- and R-RAM's digital data for the pixels corresponding to the different addresses are also compared in L-R Amplitude Comparator 230 (FIG. 5b) and L-R Slope Comparator 232. As the peak of video B is passed, the slope will be zero and the zero Flag, which was originally cleared at the start of the processor cycle, will be set in the PLA 140 (FIG. 5a). The processing continues until one pixel past point 2R (FIG. 12c) (corresponding to point 4L) where the L and R amplitudes are no longer equal. At this time, the Zero Flag is tested to determine if a maximum or minimum has been encountered between 1R and 2R. For the case Just considered, this is seen to be true and the Δ data will not be corrected in the Δ-RAM. An explanation of how incorrect data is rejected will be given subsequently herein when the processing of 3L is described. The foregoing procedure will repeat with regard to searching the R-video for a slope change. However, the R-counter will not be reset but will continue from point 2R. As the procedure continues, it will be seen that the very next pixel on the R-video will indicate a slope change onto the forward positive slope of video A. At this point the foregoing process is repeated:

a. Zero Flag is cleared,
b. The L-counter is preset to R-counter or count at (2R+1) on the R-video and 5L on the L-video,
c. The Δ-counter is set to zero,
d. The R-counter is stopped,
e. The L-counter and Δ-counter are clocked at 20 Mhz until point 6L is reached on the L-video equal to the video at 2R on the R-video.

The amplitudes and slopes are seen to be equal and the same sequence of events is repeated:

a. The Δ-counter is stopped at $\Delta_A$,
b. The R-counter is started,
c. The Δ-counter is written into the Δ-RAM at the R-address of (2R+1).

Both the L- and R-counters are then clocked over the video pulse A (at each pixel, the amplitude and slopes are compared) until the video voltage drops to zero at 3R corresponding to 7L. However, the Zero Flag will be set at the peak of video pulse A where the slope is zero. The Δ-ram address is provided by the R-counter over the range of (2R+1) to 3R. The entire cycle will repeat for a third time looking for a change in slope in the R-video. The R-counter is, therefore, clocked from 3R to 4R where the change of slope of object D is encountered. There will then be a repetition of the cycle:

a. Zero Flag cleared,
b. The L-counter preset to R-counter (8L=4R),
c. The Δ-counter is set to zero,
d. The R-counter is stopped,
e. The L- and Δ-counters are clocked at 20 Mhz,
f. However, from 8L to the end of the L-video trace no amplitude or slope match can be made and L-counter will reach the end count of 500,
g. At the end of the L-RAM address of 500 (end of stored TV line) the contents of the Δ-RAM are converted to range in the Reciprocal PROM 162 (FIG. 6b) and stored in the Range Ram 164. The contents of the Δ-counter will not be transferred to the Δ-RAM because the Zero Flag was not set.

At the end of the processor line scan the Δ-RAM will have retained the value of Δ at all R-addresses for which a Δ-match has been made, and where the video has a maximum or a minimum somewhere in each interval.

In the foregoing example, it is seen that R-counter was stopped during interval $\Delta_B$ and $\Delta_A$ and from 4R to the end of the R-video line. In general, each Δ can be expected to add to the count on the line (above the 500 line count). Search for a match to objects like D that are present only in the R-video view represents no additional addressing counts or time because the process is stopped when the L-counter completes its count. In the system, three complete counts of 500 to determine and store all acceptable Δ values are provided by the processors. Of the 1,500 total count provided, a count of 500 is required to scan all R-addresses and the remaining, 1,000 count is available to detect and store all Δ counts. Because range and Δ are reciprocal, it will be seen that short range objects like B in FIG. 12a have a large value of Δ. Unless there are many objects at short range that are small so that many large measurements are required, the 1,000 count provided is believed to be adequate. Objects at distant ranges have low counts and should not present a problem even if there are many objects.

Figure 6B:
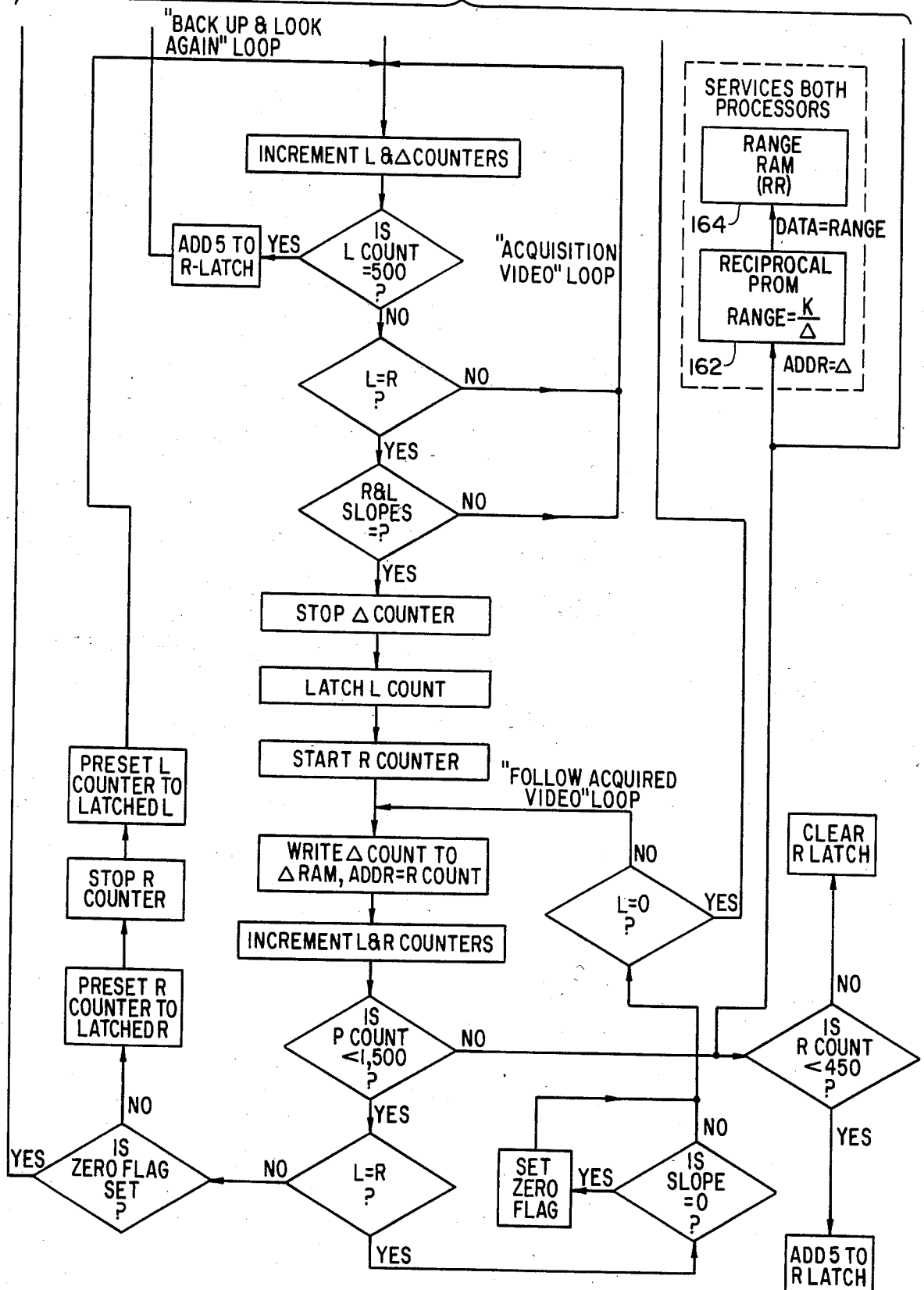

If, after a full 1,500 count at 20 Mhz, the L and R scans have not been completed, the processors will still obtain the Δ counts for objects, not yet processed. It should be noted that a full R=500 count is not required, as seen in the shaded region in FIG. 12a, for the R-camera. A count of 450 or 90% of the R-video line is shown as an arbitrary value in the Logic Flow Diagram of FIGS. 6a and 6b. To process the remainder of the unprocessed line, the R-address or R-count is stored in the R-latch 234 (FIG. 5a) when the 1,500 count is reached in the P-counter 238 (FIG. 5b) and the R-count is less than 450. Rather than resetting the R-counter the very next time the same processor is used (two TV lines later) and starting the search or scan of the R-RAM at zero address (left side of the R-display), the R-latch is sensed and if it is not reset, the R-count at the stored R-latch value is started by presetting the R-count to the R-latch. Some small number of counts can be added to the R-address above the R-latch value to speed up the processing or to avoid an excessive delay condition that may be encountered. Such condition will be described below. As indicated in FIGS. 6a and b Logic Flow Diagram, an additional count of five is provided arbitrarily. Even though the remainder of the scan line (the right side of the TV raster) is processed two TV lines later, no real resulting problem in accuracy is anticipated since most objects subtend more than three TV lines and range information is thus obtainable for the object.

In the processor (FIG. 5a), a L-latch 234 and a R-latch 236 are provided for L- and R-counters 142 and 144. These latches are used as temporary memory to permit the processors to return to an earlier state if conditions of unacceptable match are encountered. Such a condition would be a situation where no maximum or minimum is encountered in a particular measurement (Zero Flag not set). Introduction of the latches prevents excessive loss of counting time by making it possible to proceed from an intermediate counting point rather than having to return to the original starting point of counting.

For example, if a situation is encountered where:
 a. An R-amplitude change at 1R was detected (FIG. 12c),
 b. The R-counter was stopped at 1R (FIG. 6a and b),
 c. The R-count was stored in the R-latch.
 d. The Zero Flag was cleared,
 e. The L-counter 142 was preset to the R-counter 144 (at 1L in FIG. 12c),
 f. The Δ-counter was reset,
 g. Both L- and Δ-counters were clocked at 20 Mhz until point 3L was reached where the amplitudes and slopes at 1R and 3L were equal,
 h. The Δ-counter was stopped at the incorrect value of delay between B on the R-video trace with A on the L-video trace,
 i. Counter L was latched in L Latch 234. (Note that, at this point, the L- and R-latches have values stored where an error was first encountered),
 j. The R-counter 144 was started; the L- and R-counters were clocked,
 k. When proceeding along B from point 1R on the R-video trace and along A from point 3L on the L-video, the incorrect value was written into the Δ-RAM at the particular R-address starting at 1R,
 l. After a few pixels the amplitudes were not equal and from FIG. 12c, this occurred without setting the Zero Flag (no peak or minimum, zero slope, had been encountered); there was no need to test for unequal slopes because the previous L and R pixels were equal in amplitude, and inequality in the following pixels implies unequal slopes, then it can be seen from FIG. 12c, that an attempt is being made to match up R-video B with L-video A and a few incorrect Δ values have actually been stored in the Δ-RAM.

For maximum efficiency in operation, it is required to correct the listings stored in the Δ-RAM with very little back-tracking and with a minimum loss in counting time. An efficient procedure for back-tracking is important because the situation described above will probably occur quite frequently in a line scan. Latching of the L- and R-counters 142 and 144 permits rapid return (less than one 20 Mhz cycle) to the point where an error had occurred. The total time lost is, therefore, the duration of the few consecutive pixels where a match had occurred between the L- and R-video amplitudes.

When the Zero Flag is tested at time (l) above and found in the cleared state, to correct the situation, the procedure is as follows:

1. The R-counter will be preset to the R-latch count. Backtracking to 1R (to the R-latched count) is required to overwrite in the Δ-RAM where the incorrect Δ was stored, since the R-counter provides the Δ-RAM address.

2. The R-counter will be stopped at the latched count in (1) above.

3. The L-counter is preset to the L-latch. The L-counter is returned to the count corresponding to point 3L on the L-video (FIG. 12c), 4. The Δ-counter had been stopped at the incorrect Δ value and there was no need, therefore, to latch the Δ-count. The requirement is merely to continue the Δ-count to the correct value, 5. The L- and Δ-counters are clocked and, after one 20 Mhz clock cycle (at the next L-video pixel), it is unlikely that the L- and R-video will still be equal (this would imply zero L-video slope); but if it were, the match would be rejected because of the L and R slope mismatch. The L and Δ count will continue to an L-count at 9L on the L-video where the video amplitude is equal to 1R on the R-video but the slopes are of opposite sign. The amplitude and slope match will be made at L-count=2L and R-count=1R, 6. The Δ-count is stopped at $\Delta_B$, the correct value as before and the incorrect value in the Δ-RAM at address 1R is overwritten.

The sequence outlined above describes how those regions of the L-video voltage, like 3L, that have identical amplitude and slope for a few consecutive pixels at points like 1R on the R-video voltage can be corrected quickly by latching the L- and R-counters. The need for a zero slope condition (maximum or minimum) to reject small regions of incorrect slope and amplitude (L- and R-video match) is demonstrated by the above example. The function and need for the Zero Flag is, therefore, justified.

Backward Scanning Processor

Figure 13A:
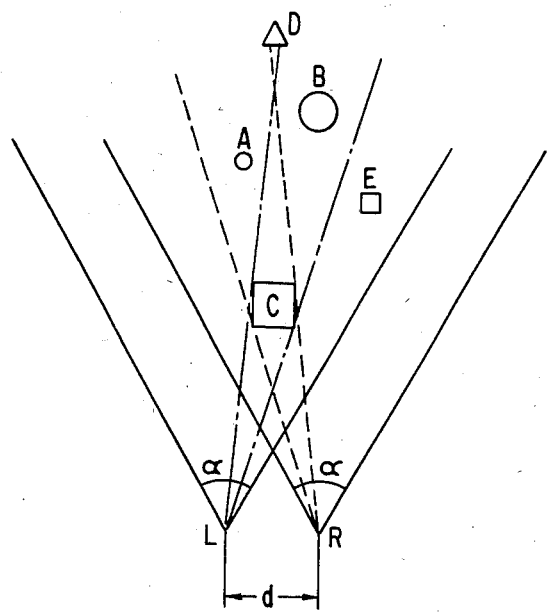
FIG. 13a is a schematic top view of multiple targets in a stereo field of the system of the present invention.
Figure 13B:
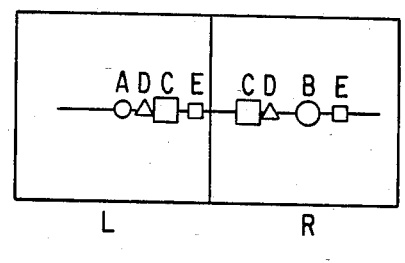
Figure 13C:
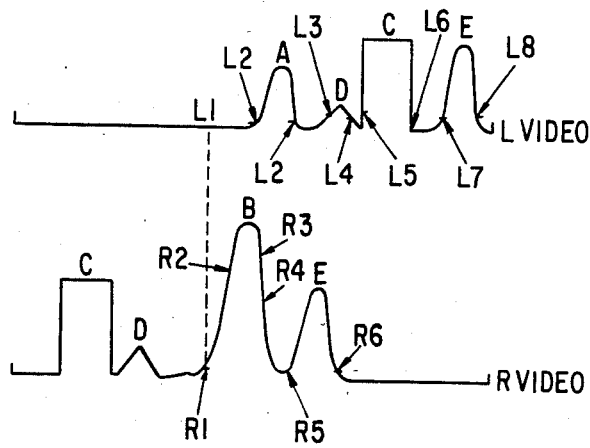
FIG. 13c is a graphical representation in an analog form of the video voltages generated during a single scan line of a scan of the FOV of FIGS. 13a and b.

As has been discussed previously herein, scanned L- and R-TV video lines are stored as they are scanned from the L- to the R-sides of the TV raster. In the write/store mode, L- and R-RAM pairs are addressed in sequence with address zero corresponding to the L-side of the TV raster and address 499 corresponding to the R-side of the TV raster. Once stored, however, the RAM can be read out in any order L to R or R to L or each randomly by correct addressing. Each of the two processors 136 and 138 provide scanning of the RAM's in opposite directions. The need for this will become apparent from the following example:

The most time and count consuming situation in the processing that arises when a video signal of an object is present on one TV scan only. This situation can result from a nearby object obscuring a distant object or by an object situated in the shaded area of FIG. 12a. In FIGS. 13a, b, and c, a situation is illustrated in which object A is obscured in the R-view and R-video by object C and object B is obscured in the L-view and L-video by object C. In the normal processor procedure described previously herein, the value of $\Delta_C$ and $\Delta_D$ will be determined in a straightforward manner; however, there will be no value for $\Delta_B$ because there is no B video in the left traces of FIG. 13c and an excessive amount of time will be lost trying to find and measure $\Delta_B$. The value of $\Delta_E$ cannot be determined until the futile search for $\Delta_B$ is completed. Processing for the evaluation of the non-existing $\Delta_B$ may take as many as two or three successive processor cycles accounting for 6 or 9 TV lines of one TV field. During the course of these TV scan lines, objects to the right of R1 in FIG. 13c such as E will not be processed and no new range data will be available for the right portion of that part of the TV raster. If both processors scanned the RAM pairs in the same direction, this effect would only be compounded. With reference to FIGS. 13a, b, c, a consideration of how this occurs is a follows:

a. After processing $\Delta_C$ and $\Delta_D$, the R-counter is stopped at R1, b. All points of the same amplitude, such as L2, L3, L4, L5, L6, L7, and L8 are candidates for a $\Delta$ measurement but, if their slopes are not correct, the end of the TV L-video line will be reached without a match for a $\Delta_B$ measurement. If, at any of these L-video points, the slope also agrees with the R-video at R1, then additional time and counts are lost backtracking to the latched L and R values as described previously herein, c. Since a 1,500 count will not be realized by the P-counter (processing time counter) 238 (FIG. 5b) at this point, the R-latch will be incremented by a count of 5 to point R2 (FIG. 13c) and, again, the end of the L-video trace will be reached without a match but within 1,500 counts on the P-counter, d. The R-latch will be set to R3 and the next try will start at this point and again end in failure. However, a count of P=1,500 will probably be realized before the end of the L-video is reached.

e. The R-latch value of R3 will be used as the starting point when the same processor is used three TV lines later, f. The futile search will cycle to R4 and R5 before video voltage E can be processed, g. It may require a third pass of the same processor, six TV lines later to process $\Delta_E$.

To avoid the above delay in processing video voltage as E the BSP processes the stored video lines from right to left. The L- or R-RAM's can be addressed in both directions. In the situation illustrated in FIGS. 13a, b, and c, the L-counter of the BSP 138 will be stopped rather than the R-counter when a change of slope is detected in the L-video, such as at L8. The R-counter is then preset to the L-counter. The $\Delta$-counter is cleared, the R-counter is decremented and the $\Delta$-counter is incremented until R6 is reached. The amplitudes and slopes are matched and the $\Delta$-counter will be stopped to $\Delta_E$ and written into the $\Delta$-RAM at address starting at R6 and ending at R5 where the video drops to zero volts. The BSP will continue to measure $\Delta_C$ in a similar manner. A problem is encountered when an effort is made to measure non-existing (in the R-FOV) $\Delta_A$ similar to that in measuring $\Delta_B$ in the FSP 136.

It is apparent, therefore, that the BSP provides range for the R-side of the TV raster first and fills in those values not yet processed by the FSP. Thus, rather than wait three or six TV scan lines for range to objects on the R side of the TV raster (for difficult and unusual situations), intermediate TV scan lines can provide range to these objects provided by the BSP. It can be seen that both the FSP and BSP compliment each other, particularly for difficult ranging situations. For both the FSP and BSP, the address in the $\Delta$-RAM and RR of the stored $\Delta$ and range respectively is the R-counter.

Programmable Logic Array (PLA)

In the operation of the processors 136 and 138, the PLA 140 is used to switch in each function described in the Logic Flow Diagram of FIGS. 6a and b. Preset L- and R-counters 142, 144 (FIG. 5a) as well as the $\Delta$-counter 146 (FIG. 5b) will be gated on or off by gating the 20 Mhz clock on or off via the AND gate 150, 152, 154 to their clock pulse (cp) inputs. Digital comparator 230 is used for amplitude comparison and digital comparator 232 is used for slope comparison. Slope is determined by feeding the digital amplitude of two successive pixels into an arithmetic unit that provides binary subtraction (typically a 74181). The 20 Mhz clocked P-counter 238 counts to 1,500 to end each $\Delta$-processing interval and to start the range conversion and RR loading sequence. Alternate TV horizontal synchronizing (H-sync.) pulses for each processor are staggered to permit the timing sequence of FIG. 8 to be realized. The PLA logic for the FSP and BSP will be slightly different in the following respects:

a. The FSP will clear the R-counter to zero at the beginning of the processor interval, whereas the BSP will reset the L-counter to 499 at the beginning of the processor interval.

b. The search for a contrast change (pixel amplitude change) will proceed by incrementing the R-counter in the FSP and by decrementing the L-counter in the BSP.

c. Upon finding a contrast change in (b) above, the R-counter is stopped in the FSP and the L-counter is stopped in the BSP. The $\Delta$-counter is reset for both processors.

d. The L-counter is then incremented in the FSP whereas the R-counter is decremented in the BSP. In both the FSP and BSP, the $\Delta$-counter is incremented.

e. End of line processing is determined by L or R equal to a 499 count in the FSP and for a zero count in the BSP.

In all other respects the two processors are identical.

Range Conversion And Range Storage

Each processor has a $\Delta$-RAM that stores the measured $\Delta$'s along a particular TV line pair. Where an object is not present in the scene on the particular TV line a zero will be stored in the $\Delta$-ram. Upon conversion to range, a reciprocal function of $\Delta$, these $\Delta$-RAM zeros would yield infinite range; however, a coded binary number will be read into the RR that can be decoded as a no range reading.

In the processor timing in FIG. 8, it will be seen that the last quarter of the processor interval (shown shaded for FSP and BSP) is allocated for the RR store. Therefore, TV line No. 1 will be range converted and stored during the last half of TV line No. 3. During the RR store interval, several events proceed in parallel:

a. The Δ-RAM 228 (FIG. 5b) is switched from a write to a read mode, b. The Δ-RAM is address scanned at a 20 Mhz rate so that all 500 addresses can be written out to the Reciprocal PROM 162 (FIG. 4) in the half TV line interval in FIG. 8, c. The Reciprocal PROM 162 is a look-up table that converts Δ to range. In addition, scaling to the desired units (feet, inches, etc.) can be incorporated. The reciprocal PROM 162 address is obtained from the Δ-RAM 228 and the reciprocal PROM 162 output data is range.

d. Reciprocal PROM outputs appear a few manoseconds after the Δ address is applied, so that within the 50 ns clock interval (20 Mhz clock) there still is time to store each of the range data in the RR, e. The RR 164 (FIG. 4) has 500×500 or 250,000 addresses to store the range of each pixel in the TV raster. Of the 18 bits to address the RR, eight MSB will be derived from an odd-even TV line counter (Y coordinate) and eight LSB will be obtained from the R-counter 144 (X coordinate) that is addressing the Δ-RAM 228 at the same time. The RR 164 will be in the write mode. Although the TV line stored in the RR is three TV lines later in time, the nine bits of the RR address bus, the nine most significant bits (MSB), have a reduced count by three to locate the range at the correct line location, f. Each of the TV lines is written into the RR from the Δ-RAM upon completion of the 1,500 count processing interval. Therefore, as shown in FIG. 8, the FSP and BSP alternately load the RR a line at a time.

Read-out of the RR can be accomplished during the intervals between the RR writing mode described above at the 20 Mhz clock rate (a line at a time). Complete range solutions are therefore available three TV lines after the actual TV line is scanned, or approximately 190 microseconds When considering the accuracy of the ranging system, it is noted that a 4 Mhz TV system has associated delays of approximately 250 ns because of bandwidth limited rise time. However, the 20 Mhz horizontal clock providing the line count for stereo ranging, counts intervals of 50 ns. What appears to be a 5-count ambiguity is avoided by considering differences for Δ and for (l-r) counts for object width measurement. All measurements to contrasting edges of the scene are made with comparator circuits 230 and 232 (FIG. 5b). These integrated circuits switch with differential inputs of only a few millivolts. If one of the differential inputs is a dc reference voltage and the other approximately one volt of video with a rise time of 250 ns, the switching point is well defined on the slope to a few tenths of a percent in both stereo views. Since the video and reference voltage are the same for each stereo field into the same comparator, the offset error in the count can be expected to be a fraction of 50 ns and will not appear in the difference of these two delays for the Δ measurement.

For the test width of a silhouette, or width of an object $(L_2-L_1)$ or $(R_2-R_1)$ in both stereo-views, the slope on the left side need not be the same as that of the right side and a count error is introduced in the object width. However, the identical error is present in both stereo-views and the $(L_2-L_1)=(R_2-R_1)$ test can be accurately applied to test for similarity of object widths in both stereo views.

For every pixel in the input scene, common to both stereo-TV cameras, the range for any change of contract for all objects visible to both stereo cameras has been stored. For those pixels where a solution has not or cannot be made, a coded number is stored in the RR. The range information is stored (written) into the RR a line at a time during one-half of a TV line scan time, two TV lines after the actual scene TV line had been scanned. In operation where display 168 (FIGS. 4 and 7) is a TV monitor and for those applications where the operator is required to specify the object in the TV scene, he can simply place the conventional light pen over the object on the TV monitor. The range can then be instantly displayed on the same TV screen directly over the object in the form of two or three digits and units.

In a situation where the operator is remotely located out of reach of the TV monitor and cannot use a light pen, a remotely controlled crosshair system can be provided as is well known in the art. The range will than appear over the object under the remotely controlled cross hairs.

Single Camera System

Figure 3:
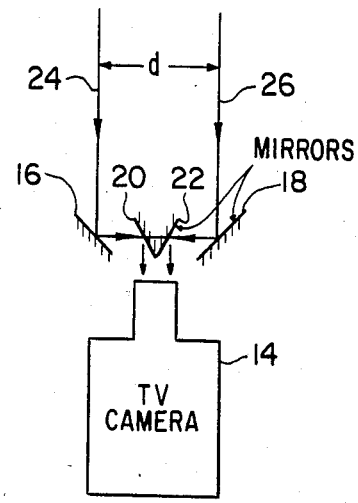
FIG. 3 is a schematic top view of a single camera embodiment of the TV stereo-ranging system of the invention.

As has been mentioned previously, a single camera can be used in the system of this invention and appropriate optics (FIG. 3) can be employed to form the stereo images. In a single-camera embodiment, four mirrors 16, 18, 20, and 22 are fixed such that two parallel lines-of-view 24 and 26 spaced distance d apart are provided. With a single TV camera 24 imaging means of FIG. 3, the split TV screen requires dividing each TV scan line into 1,000 parts to realize 500 counts per scene. TV cameras typically have a 4- or 5-Mhz bandwidth but resolution to a higher accuracy can be obtained if differences are taken or two readings at a time are operated on. Therefore, the location of a point in each stereo view can be determined to one part in 500.

Although shown described in what are believed to be the most practical and preferred embodiments, it is apparently that departures from the specific methods and designs described will suggest themselves to those skilled in the art and may be made without departing from the spirit and scope of the invention. I, therefore, do not wish to restrict myself to the particular constructions illustrated and described, but desire to avail myself of all modifications that may fall within the scope of the appended claims.

Having thus described my invention, what I claim is:

1. A TV system for the automatic quantitative ranging on at least a single remote, non-cooperating, passive object comprising:

means for presenting a scene containing said object on a light-sensitive mosaic of a line-scannable image sensing means in the form of a pair of side-by-side split-screen stereo images of said scene;

means for scanning said mosaic in a horizontal sequence of scanning lines for successively analyzing the image energy along said scanning lines and deriving output signals proportional to the light energy of features of said stereo object images, each of said scanning lines having a predetermined number of scan points;

means for counting the scan points in each image of the stereo image pair in each scanning line to said features of said object in each scene from the left side of each image pair such that the parallax displacement Δ of corresponding object features in the two stereo images can be determined; and means for processing said parallax displacements and producing an output indication of the range characterized by said parallax displacements.

2. The TV ranging system recited in claim 1 wherein the scan points in each image of the stereo image pair are counted from the right side of each image pair.

3. The TV ranging system recited in claim 1 wherein the scan points in each image of the stereo image pair are counted sequentially from the left and then from the right side of each image pair.

4. The TV ranging system recited in claim 1 wherein the means for counting the scan points are forward and backward processors and wherein the processing scan of said forward processor is from the left to the right side of each image pair alternating with a processing scan from right to left by said backward processor.

5. The TV ranging system recited in claim 1 wherein the means for presenting a scene is a single TV camera having input optics forming a stereo pair of images of the scene containing the object being ranged on the light-sensitive mosaic of said camera.

6. The TV ranging system recited in claim 1 wherein the means for presenting a scene are two side-by-side TV cameras such that the two light-sensitive mosaics of said cameras form a stereo pair of images of the scene containing the object being ranged.

7. The TV ranging system recited in claim 6 wherein the means for presenting a scene are two side-by-side solid state imaging Charge Coupled Devices (CCD's).

8. The TV ranging system recited in claim 1 wherein the spatial parallax displacement Δ is determined in terms of time delays.

9. The TV ranging system recited in claim 1 wherein each scanning line in each stereo image has at least about 500 scan points.

10. The TV ranging system recited in claim 1 wherein hard-wired logic is used for processing the parallax displacement.

11. The TV ranging system recited in claim 1 wherein a microprocessor is used to output the range data generated.

12. A TV system for the automatic quantitative ranging on at least a single remote, non-cooperating, passive object comprising:

a pair of side-by-side TV cameras spaced a distance d apart, said pair consisting of a left camera and a right camera generating a split-screen stereo image of a scene containing at least said object;

scanning means associated with each camera for simultaneously scanning both camera stereo-images from left to right in a horizontal sequence of scanning lines and generating left and right camera video output signals proportional to the light energy of the scanning points, each camera scanning line having predetermined number of scan points;

means for converting the analog video output of said cameras to a digitized form;

switching means for switching said digitized signals representing the stereo images of said left and right cameras for the simultaneous storing of said signals into left and right respectively random access memory means;

forward and backward scanning processors in a time-sharing arrangement with counting means for addressing said memory means, said processors having means for comparing signals from said left memory means with signals from said right memory means to determine time differences Δ for corresponding changes of contrast indicated by said video output signals and characterizing the spatial parallax displacements of corresponding objects in said stereo images, said time differences Δ being stored in a Δ memory means;

accessing means for the address scanning of said Δ memory means and for providing an output to a reciprocal read-only memory means, said reciprocal memory means having look-up means for converting Δ to range and outputting said range to range storage and utilizing means.

13. The TV ranging system recited in claim 12 wherein said TV cameras are solid state imaging Charge Coupled Devices (CCD's).

14. The TV ranging system recited in claim 12 wherein the spatial parallax displacement Δ is determined in terms of time delays.

15. The TV ranging system recited in claim 12 wherein the video signals are stored in the random access memory means at one clock rate and addressed and read out by the processors at another clock rate.

16. The TV ranging system recited in claim 15 wherein the video signals are addressed and read out at double the storage rate.

17. The TV ranging system recited in claim 15 wherein the video signals are stored in the random access memory means at a 10 Mhz clockrate and addressed and read out by the processors at a 20 Mhz clock rate.

18. The TV ranging system recited in claim 12 wherein the processors read out the scanning line corresponding to the left stereo-image scanline at the time the right stereo-image is scanned such that decisions of spatial parallax displacement characterizing range are made during the time the right stereo-image is scanned.

19. The TV ranging system recited in claim 12 wherein the processors have comparison means for comparing the video outputs of the left and right line scans for matching corresponding changes of contrast indicative of a specific target in the scene.

20. The TV ranging system recited in claim 19 wherein the changes in contrast indicate amplitude and slope of the video output signals.

21. The TV ranging system recited in claim 19 wherein the counting means in the processors are provided with latches that are used as temporary memories such that said processors return to an earlier state of conditions if an unacceptable match is encountered whereby counting can proceed from an intermediate point rather than being required to return to the original starting point of counting such that an excessive loss of counting time is avoided.

22. The TV ranging system recited in claim 12 wherein the video stereo-image output signals are stored in pairs of left and right random access memories and wherein the memory pairs in the store mode are addressed in sequence with address zero corresponding to the left side of each image pair and with address n corresponding to the right side of each image pair whereby the random access memories can be accessed in any order by correct addressing.

23. The TV ranging system recited in claim 22 wherein address n is typically 499.

24. The TV ranging system recited in claim 12 wherein the random access memory means comprises a number of random access memory pairs and wherein the video output signals representing a stereo-image scanning line are stored in a random access memory pair at the same time two previously stored scanned lines pairs from two other of said memory pairs are being processed by the processors.

25. The TV ranging system recited in claim 12 wherein the counting means in the processors for addressing the random access memory means containing the stereo-image video output signals comprise a left counter and a right counter and the time differences $\Delta$ are determined by a $\Delta$ counter.

26. The TV ranging system recited in claim 25 wherein the initiation of $\Delta$ measurements will be triggered by the right video output signals for the forward scanning processor and by the left video output signals for the backward scanning processor.

27. The TV ranging system recited in claim 26 wherein slope and amplitude comparison means provided in the forward scanning processor detect a signal slope and amplitude in the right video output voltage indicating a target is sensed to thereby reset the left counter to the count of the right counter and to set the $\Delta$ counter to zero, and whereby said right counter is stopped and said left and $\Delta$ counters continue counting until said slope and amplitude comparison means indicate a match between the right and left signal slope and amplitude such that a $\Delta$ count used for the determination of range is generated.

28. The TV ranging system recited in claim 26 wherein slope and amplitude comparison means provided in the backward scanning processor detect a signal slope and amplitude in the left video output voltage indicating a target is sensed to thereby reset the right counter to the count of the left counter and to set the $\Delta$ counter to zero, and whereby said left counter is stopped and said right and $\Delta$ counters continue counting until said slope and amplitude comparison means indicate a match between the right and left signal slope and amplitude such that a $\Delta$ count used for the determination of range is generated.

29. The TV ranging system recited in claims 27 or 28 wherein the forward and backward scanning processors each have a left and a right counter and wherein said counters in said forward scanning processor are initially set at zero and said counters in said backward scanning processor are initially set at 499 at the beginning of a processor interval, said counters in said forward scanning processor being incremented during processing and said counters in said backward scanning processor being decremented during processing.

30. The TV ranging system recited in claim 29 wherein the right counter in the forward scanning processor and the left counter in the backward scanning processor are stopped when a target is sensed and the $\Delta$ counters in both processors are set to zero and wherein the left counter in said forward scanning processor is incremented and the right counter in said backward scanning processor is decremented and said $\Delta$ counters are incremented until the slope and amplitude comparison means indicate a match between the right and left signal slope and amplitude such that a $\Delta$ count used for the determination of range is generated.

31. The TV ranging system recited in claim 29 wherein a 499 count in the left and right counters in the forward scanning processor and a zero count in the left and right counters in the backward scanning processor determine the end of processing of a scan line.

32. A method for the automatic quantitative ranging on at least a single remote, non-cooperating, passive object P comprising the steps of:

spacing a pair of TV cameras a distance d apart, said pair consisting of a left camera and a right camera, said cameras providing a line-scannable light-sensitive image mosaic in the form of a pair of side-by-side split-screen stereo images of a scene containing at least said object P, said cameras each having a FOV subtending an angle $\alpha$, the width W of said FOV's at different ranges from said cameras varying with the range R, there being a specific width for a specific range $$R = \frac{W}{2 \tan\left(\frac{\alpha}{2}\right)}$$

scanning said stereo image pair mosaic in a horizontal sequence of scanning lines having a predetermined number C of scan points in each scan line in each image of said stereo pair;

analyzing the image energy along said scanning lines to derive output signals proportional to the light energy of features such as object P such that a count l of scanning points from the left side to object P in said left FOV and a count r from the left side to object P in said right FOV can be derived;

subtracting count r from count l to obtain the difference $\Delta$ which is the equivalent of distance such that $$\frac{\Delta}{C} = \frac{d}{W}$$

whereby the range to object P in the combined FOV's is $$R = \frac{dC}{2\Delta \tan\left(\frac{\alpha}{2}\right)} = \frac{K}{\Delta}$$

where K is a design parameter $$K = \frac{dC}{2 \tan\left(\frac{\alpha}{2}\right)}$$

33. A method for the automatic quantitative ranging on at least a single remote, non-cooperating, passive object P comprising the steps of:

spacing a pair of TV cameras a distance d apart, said pair consisting of a left camera and a right camera, said cameras providing a line-scannable light-sensitive image mosaic in the form of a pair of side-by-side split-screen stereo images of a scene containing at least said object P, said cameras each having a FOV subtending an angle $\alpha$, the width W of said FOV's at different ranges from said cameras varying with the range R, there being a specific width for a specific range $$R = \frac{W}{2\tan\left(\frac{\alpha}{2}\right)}$$

scanning said stereo image pair mosaic in a horizontal sequence of scanning lines having a predetermined number C of scan points in each scan line in each image of said stereo pair;

analyzing the image energy along said scanning lines to derive output signals proportional to the light energy of features such as said object P such that a count l of scanning points from the right side to object P in said left FOV and a count r from the right side to object P in said right FOV can be derived;

subtracting count l from count r to obtain the difference Δ which is the equivalent of distance such that $$\frac{\Delta}{C} = \frac{d}{W}$$

whereby the range to object P in the combined FOV's is $$R = \frac{dC}{2\Delta\tan\left(\frac{\alpha}{2}\right)} = \frac{K}{\Delta}$$

where K is a design parameter $$K = \frac{dC}{2\tan\left(\frac{\alpha}{2}\right)}$$

34. The method recited in claims 32 or 33 wherein the angle α is the view angle of the stereo camera lenses and wherein the range ratio $$\frac{R_{max}}{R_{min}} = C$$

is changed by changing the lenses to change angle α.

35. A method for the automatic quantitative ranging on at least a single remote, non-cooperating, passive object comprising the steps of:

presenting a scene containing said object on a light-sensitive mosaic of a line-scannable image sensing means in the form of a pair of side-by-side split-screen stereo images of said scene;

scanning said mosaic in a horizontal sequence of scanning lines for successively analyzing the image energy along said scanning lines and deriving output signals proportional to the light energy of features of said stereo object images, each of said scanning lines having a predetermined number of scan points;

counting the scan points in each image of the stereo image pair in each scanning line to said features of said object in each scene from the left side of each image pair such that the parallax displacement Δ of corresponding object features in the two stereo images can be determined; and processing said parallax displacements and producing an output indicative of the range characterized by said parallax displacements.

36. The method recited in claim 35 wherein the scan points in each image of the stereo image pair are counted from the right side of each image pair.

37. The method recited in claim 35 wherein the scan points in each image of the stereo image pair are counted sequentially from the left and then from the right side of each image pair.

* * * * *